(12) United States Patent
DeFaria et al.

(10) Patent No.: US 10,657,727 B2
(45) Date of Patent: *May 19, 2020

(54) PRODUCTION AND PACKAGING OF ENTERTAINMENT DATA FOR VIRTUAL REALITY

(71) Applicant: WARNER BROS. ENTERTAINMENT INC., Burbank, CA (US)

(72) Inventors: Christopher DeFaria, Los Angeles, CA (US); Piotr Mintus, Seattle, WA (US); Gary Lake-Schaal, Los Angeles, CA (US); Lewis Ostrover, Los Angeles, CA (US)

(73) Assignee: WARNER BROS. ENTERTAINMENT INC., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/277,918

(22) Filed: Feb. 15, 2019

(65) Prior Publication Data

US 2019/0251751 A1    Aug. 15, 2019

Related U.S. Application Data

(63) Continuation of application No. 15/289,090, filed on Oct. 7, 2016, now Pat. No. 10,249,091.

(Continued)

(51) Int. Cl.
*G06T 19/00* (2011.01)
*H04N 13/356* (2018.01)
(Continued)

(52) U.S. Cl.
CPC ............ *G06T 19/006* (2013.01); *G06F 3/013* (2013.01); *G06F 3/0487* (2013.01); *H04N 13/356* (2018.05); *G06T 2215/16* (2013.01)

(58) Field of Classification Search
None
See application file for complete search history.

(56) References Cited

U.S. PATENT DOCUMENTS 7,333,967 B1 * 2/2008 Bringsjord ............... G06N 5/00
  706/45
8,381,108 B2 * 2/2013 Fuller ..................... G06F 3/017
  715/727

(Continued)

FOREIGN PATENT DOCUMENTS

WO    WO-2015185579 A1 * 12/2015   ......... G06F 3/04815

OTHER PUBLICATIONS

Riedl et al, "From Linear Story Generation to Branching Story Graphs", IEEE Computer Graphics and Applications, 2006. (Year: 2006).*

*Primary Examiner* — Zhengxi Liu
*Assistant Examiner* — Patrick F Valdez
(74) *Attorney, Agent, or Firm* — One LLP; Jonathan Jaech

(57) ABSTRACT

An augmented reality (AR) output device or virtual reality (VR) output device is worn by a user and includes one or more sensors positioned to detect actions performed by a user of the immersive output device. A processor provides a data signal configured for the AR or VR output device, causing the immersive output device to provide AR output or VR output via a stereographic display device. The data signal encodes audio-video data. The processor controls a pace of scripted events defined by a narrative in the one of the AR output or the VR output, based on output from the one or more sensors indicating actions performed by a user of the AR or VR output device. The audio-video data may be packaged in a non-transitory computer-readable medium with additional content that is coordinated with the defined (Continued)

narrative and is configured for providing an alternative output, such as 2D video output or the stereoscopic 3D output.

20 Claims, 13 Drawing Sheets

Related U.S. Application Data

(60) Provisional application No. 62/239,763, filed on Oct. 9, 2015.

(51) Int. Cl.
*G06F 3/0487* (2013.01)
*G06F 3/01* (2006.01)

(56) References Cited

U.S. PATENT DOCUMENTS 9,665,170 B1* 5/2017 Ross ................. G06F 3/011
2011/0319148 A1* 12/2011 Kinnebrew .......... A63F 13/216
463/1

* cited by examiner

CONFIGURING, BY AT LEAST ONE COMPUTER, AUDIO-VIDEO DATA FOR PROVIDING A VIRTUAL REALITY (VR) OUTPUT WHEN PROCESSED BY AN OUTPUT DEVICE, WHEREIN THE VR OUTPUT IS ORGANIZED ACCORDING TO A PREDEFINED NARRATIVE

1420

PACKAGING THE AUDIO-VIDEO DATA IN A COMPUTER-READABLE MEDIUM WITH ADDITIONAL CONTENT COORDINATED WITH THE PREDEFINED NARRATIVE AND CONFIGURED FOR PROVIDING AN ALTERNATIVE OUTPUT

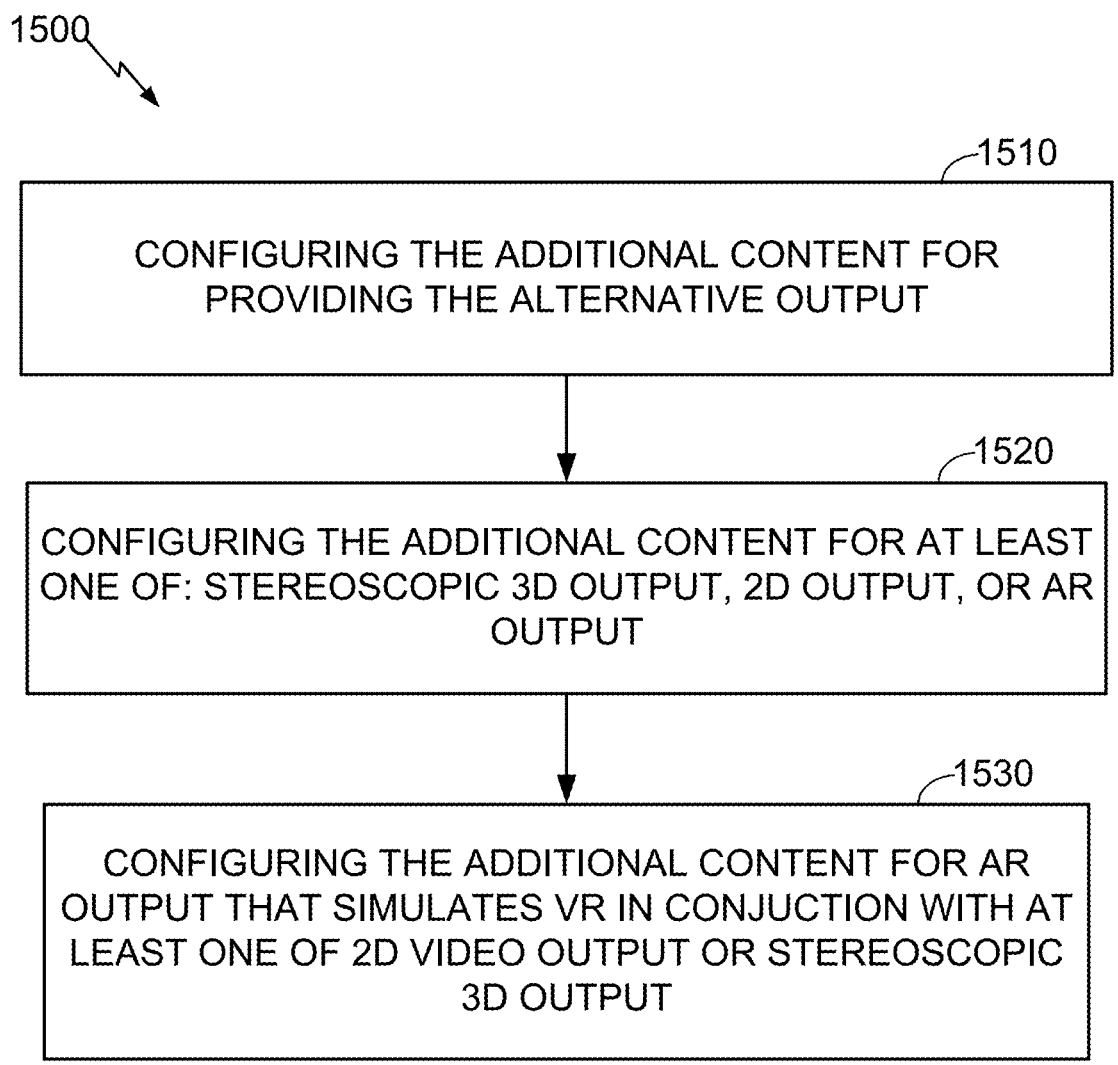

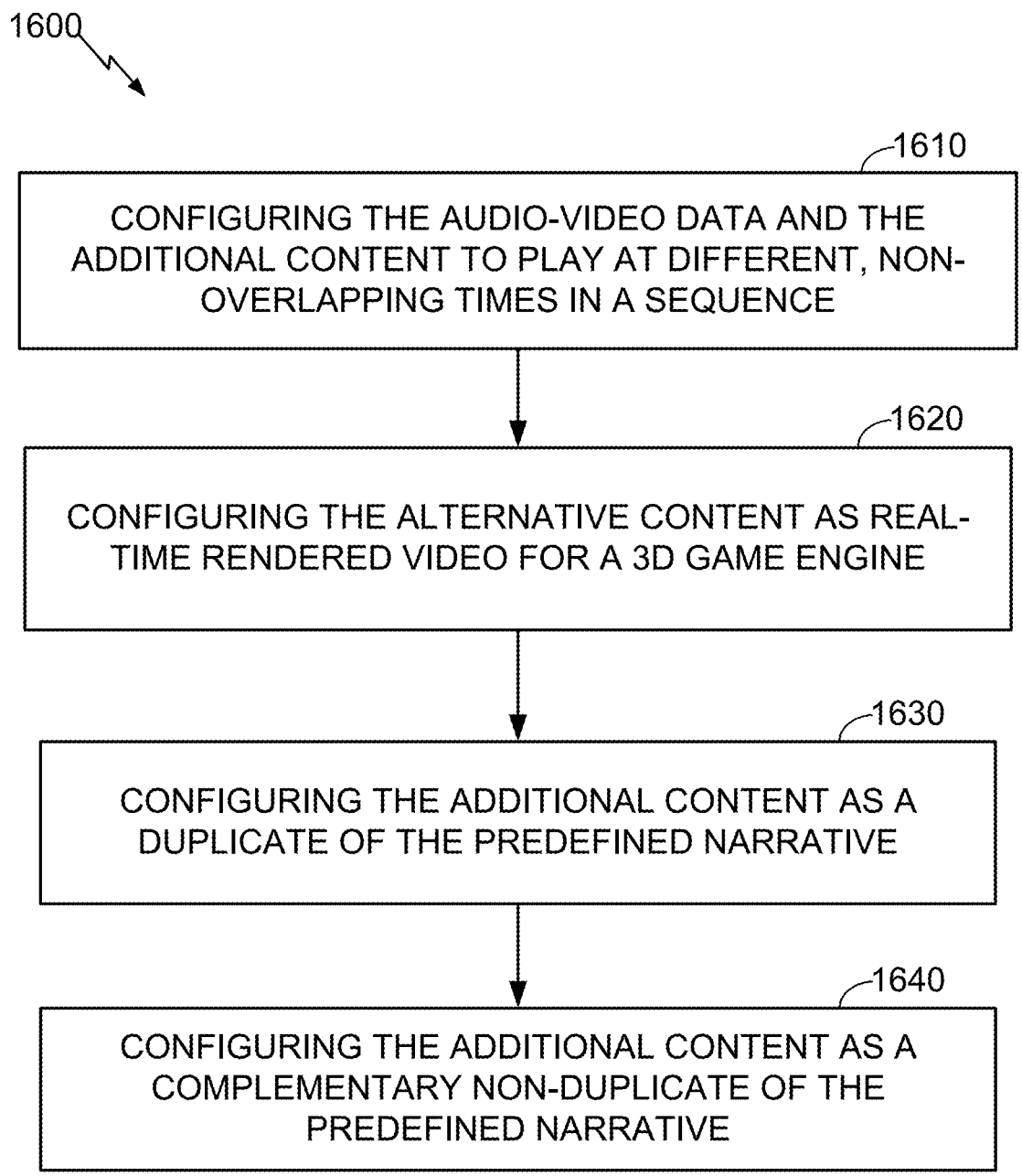

PRODUCTION AND PACKAGING OF ENTERTAINMENT DATA FOR VIRTUAL REALITY

CROSS-REFERENCE TO RELATED APPLICATION

This application is a continuation of U.S. patent application Ser. No. 15/289,090 filed Oct. 7, 2016, now issued U.S. Pat. No. 10,249,091, which claims priority pursuant to 35 U.S.C. § 119(e) to U.S. provisional application Ser. No. 62/239,763 filed Oct. 9, 2015, the disclosures of all of which are hereby incorporated by reference in their entireties for all purposes.

FIELD

The present disclosure relates to the production and configuration, by a computer, of digital data for virtual reality or augmented reality output.

BACKGROUND

"Virtual reality" is a term that has been used for various types of content that simulates immersion in a three-dimensional (3D) world, including, for example, various video game content, and animated film content. In some types of virtual reality, a user can navigate through a simulation of a 3D environment generated based on the computer model, by controlling the position and orientation of a virtual camera that defines a viewpoint for a 2D scene that is displayed on a two-dimensional display screen. A variation of these technologies is sometimes called "augmented reality." In an augmented reality setup, the display technology shows a combination of the user's surroundings that is "augmented" by one or more digital objects or overlays. Augmented reality content may be as simple as textual "heads up" information about objects or people visible around the user, or as complex as transforming the entire appearance of the user's surroundings into a fantasy environment that corresponds to the user's real surroundings.

Virtual reality (VR) and augmented reality (AR) have been applied to various types of immersive video stereoscopic presentation techniques including, for example, stereoscopic virtual reality headsets. Headsets and other presentation methods immerse the user in a 3D scene. Lenses in the headset enable the user to focus on a lightweight split display screen mounted in the headset only inches from the user's eyes. Different sides of the split display show right and left stereoscopic views of video content, while the user's peripheral view is blocked. In another type of headset, two separate displays are used to show different images to the user's left eye and right eye respectively. In another type of headset, the field of view of the display encompasses the full field of view of eye including the peripheral view. In another type of headset, an image is projected on the user's retina using controllable small lasers, mirrors or lenses. Either way, the headset enables the user to experience the displayed virtual reality content more as if the viewer were immersed in a real scene. In the case of augmented reality (AR) content, the viewer may experience the augmented content as if it were a part of, or placed in, the augmented scene.

These immersive effects may be provided or enhanced by motion sensors in the headset that detect motion of the user's head and adjust the video display(s) accordingly. By turning his head to the side, the user can see the virtual reality scene off to the side; by turning his head up or down, the user can look up or down in the virtual reality scene. The headset may also include tracking sensors that detect position of the user's head and/or body and adjust the video display(s) accordingly. By leaning in, the user can see the virtual reality scene from a different point of view. By leaning to the side, the user can see the virtual reality scene from a different point of view. This responsiveness to head movement, head position and body position greatly enhances the immersive effect achievable by the headset. The user may be provided the impression of being placed inside or "immersed" in the virtual reality scene.

These immersive virtual reality ("VR") headsets and other immersive technologies are especially useful for game play of various types, which involve user exploration of a modelled environment generated by a rendering engine as the user controls one or more virtual camera(s) using head movement, the position or orientation of the user's body, head, eye, hands, fingers, feet, or other body parts, and/or other inputs. To provide an immersive experience, the user needs to perceive a freedom of movement that is in some way analogous to human visual perception when interacting with reality. Content produced for VR can provide this experience using techniques for real-time rendering that have been developed for various types of video games. The content may be designed as a three-dimensional computer model with defined boundaries and rules for rendering as video output. This content can be enhanced by stereoscopic techniques to provide stereoscopic output, sometime referred to as "3D," and associated with a VR application that manages the rendering process in response to movement of the VR headset, to produce a resulting VR experience. The user experience is very much like being placed inside a rendered video game.

In other types of VR and AR, the simulated 3D environment may be used primarily to tell a story, more like traditional theater or cinema. In this type of VR or AR, the added visual effects may enhance the depth and richness of the story's narrative elements or special effects, without giving the user full control (or any control) over the narrative itself. However, the technology for experiencing anything similar to cinematic content delivered using VR or AR equipment or methods is in a very early stage of development. Actual implementations of technology are quite limited, and users have thus far been largely or completely untouched by VR or AR in their experience of narrative content.

It would be desirable, therefore, to develop new methods and other new technologies for to produce or package narrative content, that overcome these and other limitations of the prior art and enhance the appeal and enjoyment of narrative content for new immersive technologies such as VR and AR.

SUMMARY

This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In an aspect of the disclosure, a computer-implemented method includes providing, by a processor, a data signal configured for an output device, wherein the data signal provides one of an augmented reality (AR) output or a virtual reality (VR) output when processed by the immersive output device. The method may further include controlling, by the computer, a pace of scripted events defined by a narrative in the one of the AR output or the VR output, based on sensor output indicating actions performed by a user of the immersive output device.

As used herein, "pace" means a time-based rate, accordingly, a "pace of scripted events" means a measure of how many scripted events occur per unit time. A "scripted event" in the context of the present disclosure means initiation of an independent, continuous narrative sequence that is encoded in recorded data used for generating AR or VR output. For example, a script for a VR recording may call for George Washington to chop down a cherry tree, and then confess doing so. The recording may include two independent, narrative sequences encoded in the VR data: a chopping sequence and a confessing sequence. Because the sequences are independent parts of the VR data, they may be performed with a variable amount of delay between them. Less delay between the events correlates to a faster pace of scripted events, and greater delay to a slower pace. Non-narrative "filler" content may be used to fill the delay period between scripted events. A VR or AR engine may select different filler content based on the identify of adjacent independent narrative sequences.

In certain embodiments or aspects, the method includes maintaining a predetermined order of the scripted events according to the narrative. The maintaining may further include varying an order of the scripted events based on the sensor data, subject to a narrative hierarchy. In an aspect, the narrative hierarchy defines narrative relationships between groups of events and permits events within each group to occur in any chronological order based on the sensor output.

In other embodiments or aspects, the method may include detecting that the pace is less than a minimum pace defined for a sequence of the scripted events. For example, the method may include providing sensory cues via the immersive output device for cueing at least one user action for increasing the pace, based on the detecting. In an aspect, the processor may receive the sensor output from at least one of a motion sensor coupled to the immersive output device, a Global Positioning System (GPS) receiver, or an optical sensor configured for detecting at least one of eye movement or orientation.

In other embodiments or aspects, the method includes detecting that the pace greater is than a maximum pace defined for a sequence of the scripted events. In such cases, the method may include ignoring sensor output indicating that pace should be increased and decreasing, or not increasing, the pace, based on the detecting. In an aspect, the scripted events include activities of a character appearing in the one of the AR output or the VR output.

In another aspect of the disclosure, a method may include configuring, by at least one computer, audio-video data for providing a VR output when processed by an output device, wherein the VR output is organized according to a predefined narrative. The method may further include packaging the audio-video data in a computer-readable medium with additional content coordinated with the predefined narrative and configured for providing an alternative output.

In alternative aspects, the alternative output comprises any one or more of an audio-video output that is not VR output, a stereoscopic three-dimensional (3D) output, or an augmented reality (AR) output. In an aspect, AR output may be configured to simulate a VR output when used in conjunction with at least one of two-dimensional (2D) video output or stereoscopic three-dimensional (3D) output. The audio-video data and the additional content may be configured to play at different, non-overlapping times in a sequence, or to play contemporaneously in parallel. In an aspect, the alternative output may be, or may include, real-time rendered video, and the additional content may be, or may include, a three-dimensional (3D) model and game engine. In some embodiments, the additional content may include a duplicate of the predefined narrative; in an alternative, or in addition, the additional content may complement the predefined narrative without duplication. In other, related aspects, the packaging operation may further include recording positional audio data in the computer-readable medium, wherein the positional audio data is configured to cause at least one of mono, stereo, multichannel or object-oriented audio output when provided to the immersive output device.

Any of the foregoing methods may be implemented in any suitable programmable computing apparatus, by provided program instructions in a non-transitory computer-readable medium that, when executed by a computer processor, cause the apparatus to perform the described operations. Other elements of the apparatus may include, for example, a display screen, an audio output device, and a user input device, which participate in the execution of the method. In addition to personal computers and game consoles, an apparatus may include a virtual reality device, such as a headset or other display that reacts to movements of a user's head or body to provide the impression of being placed inside of the rendered scene in which the game is played.

To the accomplishment of the foregoing and related ends, one or more examples comprise the features hereinafter fully described and particularly pointed out in the claims. The following description and the annexed drawings set forth in detail certain illustrative aspects and are indicative of but a few of the various ways in which the principles of the examples may be employed. Other advantages and novel features will become apparent from the following detailed description when considered in conjunction with the drawings and the disclosed examples, which encompass all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify like elements correspondingly throughout the specification and drawings.

FIG. 14 is a flow chart illustrating a method for packaging immersive VR content with related alternative content.

FIGS. 15-16 are flow charts illustrating further optional aspects or operations of the method diagrammed in FIG. 14.

DETAILED DESCRIPTION

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

Figure 1:
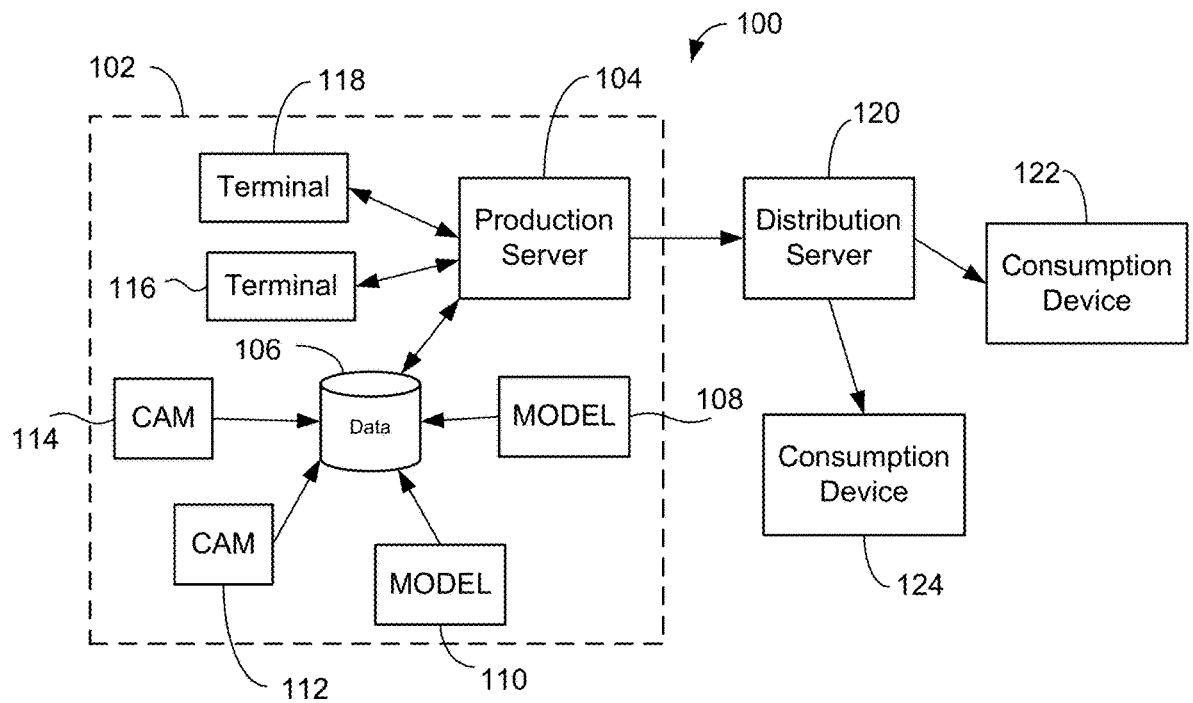
FIG. 1 is a schematic block diagram illustrating aspects of a system and apparatus for the production and configuration of digital data for virtual reality or augmented reality output coupled to a distribution system.

An illustrative system 100 for production and distribution of immersive content (e.g., AR and VR) in coordination with non-immersive content (e.g., 2D video with audio, stereoscopic 3D video with audio, non-immersive video games) is shown in FIG. 1. The system 100 may include a set 102 of production activities that produce assets that are shared and used in different ways across related different versions (immersive and non-immersive) of underlying creative content. Creative content includes, for example, video data collected by various camera systems 112, 112, audio data collected and/or generated by audio subsystems (not shown), and computer modeling/animation data created and arranged from various modeling/animation subsystems 108, 110. Creative content may be stored in a data store 106. It should be appreciated that the system may include several different data stores (not shown). A production server component, which may comprise a family of production applications operating over a computer network, may access data in the data store 106 under control of various production staff controlling the production process via multiple access terminals 118, 116. The number of components shown in system 100 is merely illustrative. It should be appreciated that a typical feature film or other studio production system will typically include a much larger number of components than illustrated. Creative and technical directors oversee the assembly of creative content from the various data sources, configured for immersive output devices and more traditional non-immersive devices.

Digital content produced by the system may include various versions of the same story, for example, a 2D theater version; a 2D home theater version; a mobile device version; stereoscopic 3D version for one or more of theater, home or mobile devices, a VR version for an in-theater experience, optionally in conjunction with supporting 2D or stereoscopic 3D content, a VR version for home use, likewise optionally for use with non-immersive content; an AR version for supplementing non-immersive content in a theater, an AR version for supplementing non-immersive content in a home theater environment or in a mobile device format, and video game content in one or more of the foregoing output formats. Finished productions in each of the various versions may be provided to a distribution server 120, which may store the different versions in a content data store (not shown) in association with metadata for managing use and distribution. It should be appreciated that while FIG. 1 shows a single distribution server 120 providing content to consumption devices 122, 124, in the general case, different distribution channels each assigned its own server resources may be used to provide content to different sets of end users. Nonetheless, there will be at least one set of consumers that receives multiple versions of immersive and non-immersive content in a single digital content (media) package, whether stored under control of a network served 120, or locally on a computer-readable medium such as an optical disc or memory device.

In some embodiments, the media package may be, or may include, a single computer-readable medium (for example, an optical disc medium or FLASH memory device) in which packaged digital content is stored together. Distribution of a non-transitory, tangible and portable storage medium may reduce network bandwidth demands and ensure reliable and seamless access to dense digital content by the consumption device. In some embodiments, rapid distribution to tangible media may be accomplished by distribution from selected kiosks holding electronic copies of digital content for writing to digital copies. In an alternative, such kiosks may take advantage of high-bandwidth connections to obtain the electronic content for distribution. In other embodiments, the electronic content may be transmitted over a communications network and/or computer network and stored directly on a memory device or medium connected to or integrated with a client device that will participate in playback of the received content.

Figure 2:
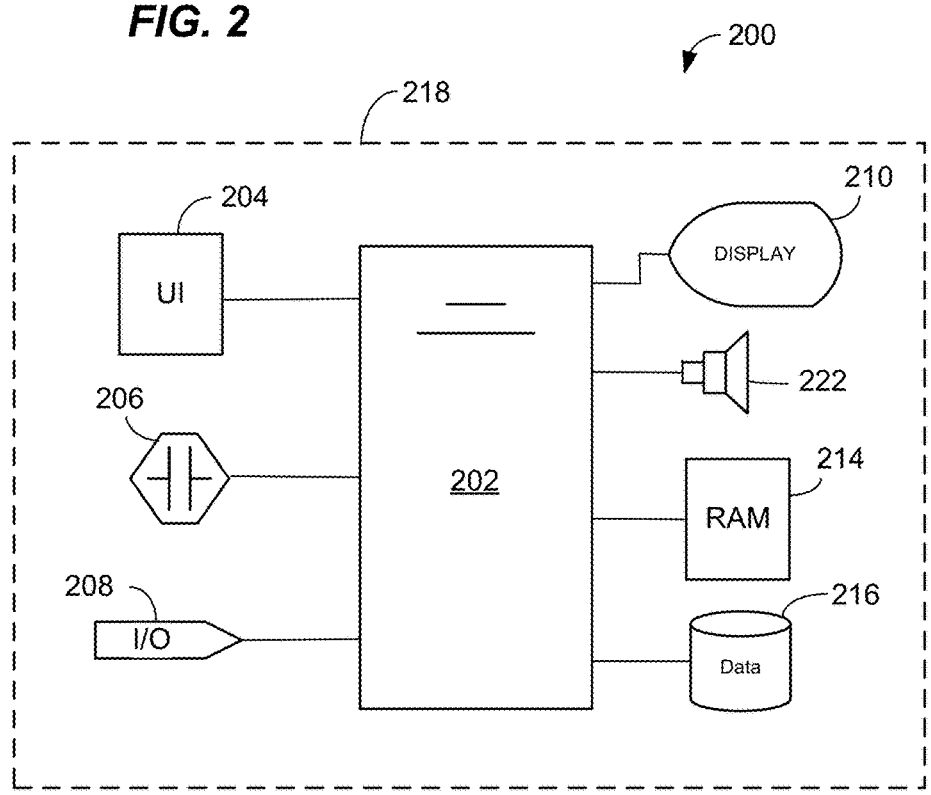
FIG. 2 is a schematic block diagram illustrating more detailed aspects of an apparatus for outputting virtual reality or augmented reality content.

Referring to FIG. 2, aspects of a content consumption device 200 for consuming VR or AR content are illustrated. The apparatus 200 may include, for example, a processor 202, for example a central processing unit based on 80×86 architecture as designed by Intel™ or AMD™, or a system-on-a-chip as designed by ARM™. The processor 202 may be communicatively coupled to auxiliary devices or modules of the 3D environment apparatus 200, using a bus or other coupling. Optionally, the processor 202 and some or all of its coupled auxiliary devices or modules (examples of which are depicted at 204-216) may be housed within or coupled to a housing 218, for example, a housing having a form factor of a personal computer, gaming console, smart phone, notepad computer, laptop computer, set-top box, wearable googles, glasses, or visors, or other form factor.

A user interface device 204 may be coupled to the processor 202 for providing user control input to a game process operated by a VR game engine executing on the processor 202. User control input may include, for example, selections from a graphical user interface or other input (e.g., textual or directional commands) generated via a touch screen, keyboard, pointing device (e.g., game controller), microphone, motion sensor, camera, or some combination of these or other input devices. Control input may also be provided via a sensor 206 coupled to the processor 202. A sensor may comprise, for example, a motion sensor (e.g., an accelerometer), a position sensor, a temperature sensor, a location sensor (for example, a Global Positioning System (GPS) receiver and controller), an eye-tracking sensor, or a microphone. The sensor 206 may detect a motion or other state of a user interface display, for example, motion of a virtual-reality headset, or the bodily state of the user, for example, skin temperature or pulse.

The device 200 may optionally include an input/output port 208 coupled to the processor 202, to enable communication between a VR/AR engine and a computer network. Such communication may be used, for example, to enable multiplayer VR or AR experiences, including but not limited to game play. The system may also be used for non-gaming multi-user applications, for example social networking, group entertainment experiences, instructional environments, and so forth.

A display 220 may be coupled to the processor 202, for example via a graphics processing unit (not shown) integrated in the processor 202 or in a separate chip. The display 210 may include, for example, a flat screen color liquid crystal display (LCD) illuminated by light-emitting diodes (LEDs) or other lamps, a projector driven by an LCD or by a digital light processing (DLP) unit, a laser projector, or other digital display device. The display device 210 may be incorporated into a virtual reality headset or other immersive display system. Video output driven by a game engine operating on the processor 202, or other application for coordinating user inputs with events simulated in a 3D environment, may be provided to the display device 210 and output as a video display to the user (also referred to herein as the "player"). Similarly, an amplifier/speaker or other audio output transducer 222 may be coupled to the processor 202 via an audio processing system. Audio output correlated to the video output and generated by the game engine or other application may be provided to the audio transducer 222 and output as audible sound to the user.

The 3D environment apparatus 200 may further include a random access memory (RAM) 214 holding program instructions and data for rapid execution or processing by the processor during controlling a 3D environment. When the device 200 is powered off or in an inactive state, program instructions and data may be stored in a long-term memory, for example, a non-volatile magnetic, optical, or electronic memory storage device 216. Either or both of the RAM 214 or the storage device 216 may comprise a non-transitory computer-readable medium holding program instructions, that when executed by the processor 202, cause the device 200 to perform a method or operations as described herein. Program instructions may be written in any suitable high-level language, for example, C, C++, C#, or Java™, and compiled to produce machine-language code for execution by the processor. Program instructions may be grouped into functional modules, to facilitate coding efficiency and comprehensibility. It should be appreciated that such modules, even if discernable as divisions or grouping in source code, are not necessarily distinguishable as separate code blocks in machine-level coding. Code bundles directed toward a specific type of function may be considered to comprise a module, regardless of whether or not machine code on the bundle can be executed independently of another machine code. In other words, the modules may be high-level modules only.

Narrative storytelling is traditionally based on a fixed chain of events. In moviemaking, the movie reel or its electronic equivalent naturally enforces an inflexible chronology for the narrative events experienced by the viewer, while the movie frame ensures that the viewer is focused on the relevant action. Although VR content can be played like a movie reel, the viewer's perception depends on which part of the virtual reality space the user is focused on. If events can occur all around the view point of the person wearing VR equipment, there is a substantial risk that a viewer may miss relevant action when looking at a different part of the VR environment and be unable to follow the story line. On the other hand, if all the action takes place in a particular spot, the immersive experience provided by the VR content is lost. Similar viewer distraction from key narrative events can occur with AR content. Audio cues may be used to direct a viewer's attention to a particular spot, but if relied on too heavily, may detract from the viewing experience. New methods for organizing VR and AR content to provide a narrative experience without eliminating the feeling of being immersed in an environment and able to look and move around it are needed.

Figure 3:
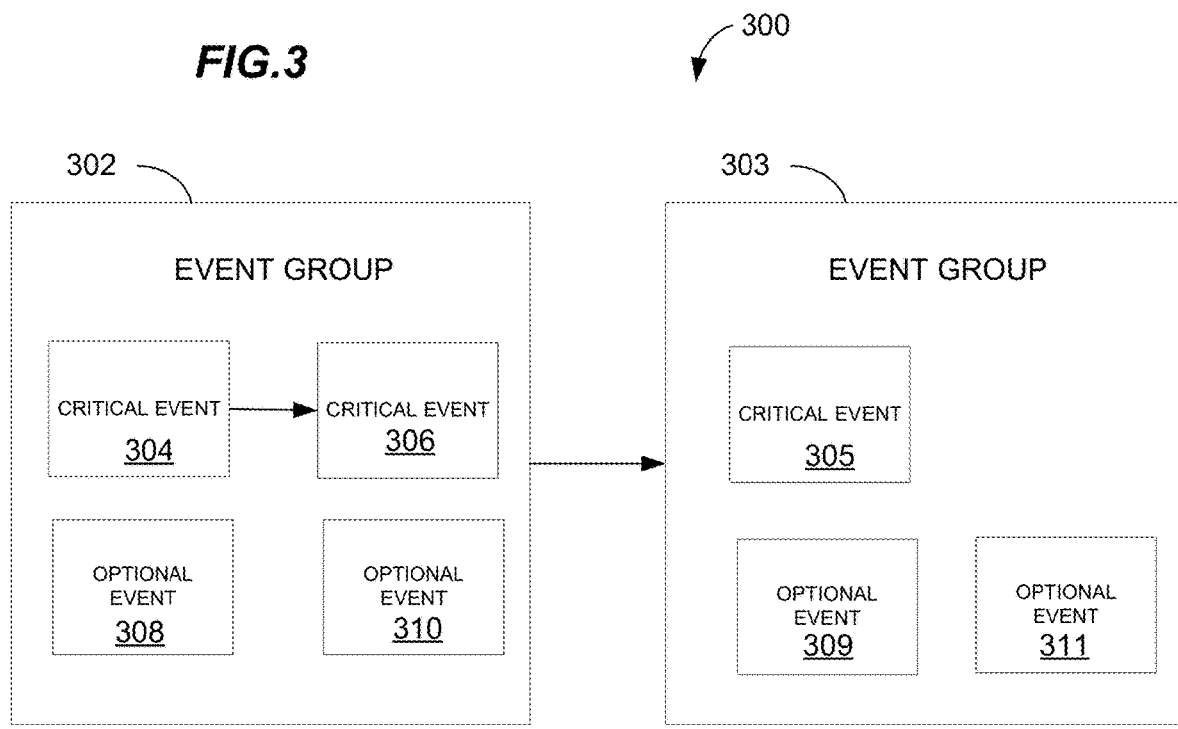
FIG. 3 is a block diagram illustrating aspects of an event hierarchy for methods of controlling a pace of immersive content.

FIG. 3 illustrates aspects of organizing a narrative story line for VR or AR environments. Instead of a fixed chain of events outlined by traditional scripts, a narrative defines a chain 300 of event groups 302, 303 (two of many shown). Each event group 302, 303 may include multiple events. One or more event in each group may be classed as a "critical" event, meaning that it is deemed necessary to follow the narrative story line. For example, the event group 302 includes two critical events: the event 304, and the event 306. Critical events within a group may be designated to occur in a particular order. For example, the arrow from the event 304 to the event 306 indicates that the event 304 should occur before the event 306. In other groups, multiple critical events may occur in any order, so long as all of the critical events in the group occur prior to any event from a subsequent group. Each group 302, 303 may include any non-zero number of critical events, and any number (zero or more) of optional events 308, 309, 310, 311.

A pace controller keeps the narrative flow within the constraints of the event group chain 300, subject to any finer rules for events within the groups. Further discussion of pace control is provided below, starting with FIG. 4.

Optional events 308, 310 are not set to occur in any order, but can only occur while the event group 302 is the currently active group. For example, the event group 302 may pertain to a particular scene in the narrative, and all of the events within the group are set to occur before the scene has past. With scene-based events, the user's movements or other interactions with a particular scene can be used to trigger optional or critical events. For example, a VR or AR headset may include position and orientation sensors, data from which may be used to trigger playback of associated audio/video clips in an immersive format. The user may experience all of the events within the group 302 as a natural consequence of exploring the scene, and will not generally receive any explicit indication of which events are critical, and which optional. The length of time for which play remains in an event group may depend on factors as determined by the creative content producers, for example, until all critical events have occurred, until all events have occurred, or in either case until a particular time period has elapsed.

Once an event group's time is passed, play proceeds to the next event group 303, which, by way of example, includes a single critical event 305 and two optional events 309, 311.

In an aspect, optional events may appear in more than one event group. For example, optional events may appear in different event groups that occur in the same physical scene, may be events that can occur in more than one scene, or may be played as a flashback to a prior scene. In general, optional events may be designed to augment and enrich a user's understanding of the story line, while conveying information that is not necessary to understand the main narrative flow. The optional events may be provided as extra, hidden story elements to reward those interested in exploring a particular narrative in greater detail. A more passive viewer may interact less with the environment, and may primarily view the critical events, without being deprived of the narrative core provided by the content.

Figure 4:
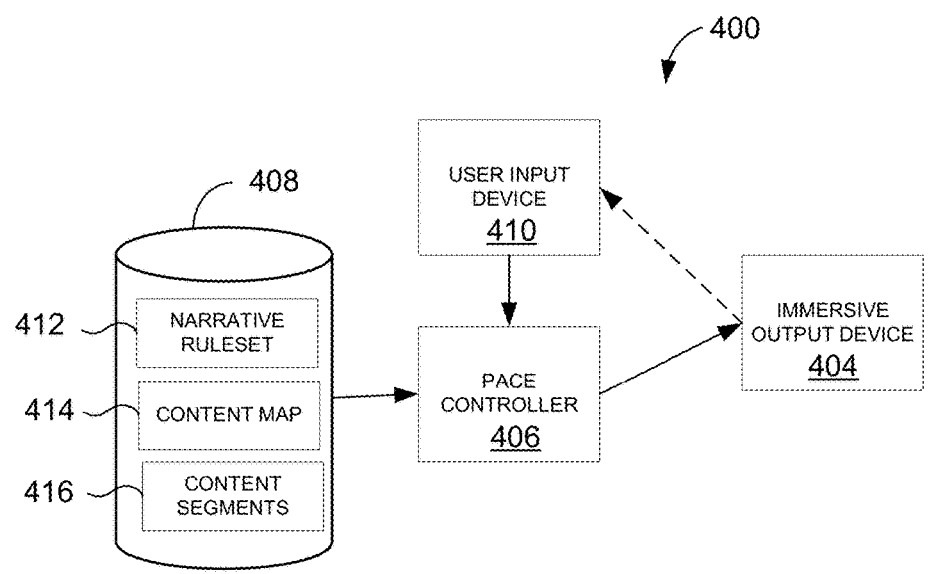
FIG. 4 is a concept diagram illustrating elements of a system for pace control of immersive content.

Referring to FIG. 4, a system 400 for pace control is illustrated in block form. Elements of the system 400 include a data source 408, coupled to a pace controller module 406 in communication with an immersive output device 404 and a user input device 410. The data source 408 may be, or may include, a computer memory or computer-readable medium. The pace controller 406 may include a programmable computer processor programmed to perform pace control operations as described herein. The immersive output device 404 may comprise a headset or simulator device equipped with sensors to detect user input. The user input device 410 may include one or more of position, orientation, or motion sensors coupled to a user's body, and/or a control panel operable by user manipulation or other bodily input.

The pace controller may operate based on different data stored in the data source 408. The different data may include, for example, a narrative ruleset 412 that defines the pace of different narrative events based on one or more control criteria. An event group chain 300 as discussion in connection with FIG. 3 is an example of a narrative ruleset 412. Other arrangements of narrative rulesets may also be suitable. The different data may further include a content map 414 that maps narrative control elements of the ruleset 412 to specific ones of a set of content segments 416 making up the VR or AR content to be provided for output by the immersive output device 404. The content segments 416 may include 3D model data used to render a scene and/or narrative event, prerecorded rendered immersive content data depicting multiple views of a scene or narrative event, or some combination of data for real-time rendering and rendered data. In either case, the order and pace of presenting the content segments is determined by the pace controller 406, based on the ruleset 412 and content map 414, and responsive to user input via a user input device 410 coupled to the immersive output device.

Figure 5:
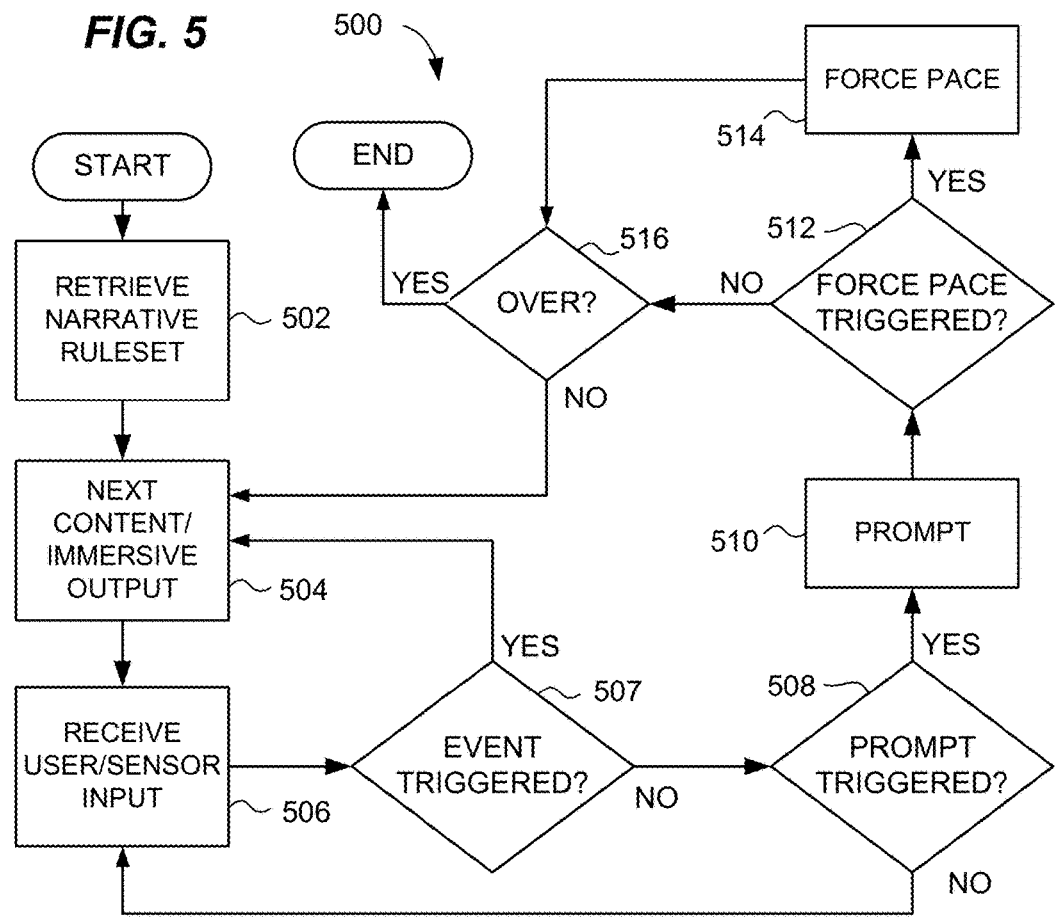
FIG. 5 is a flow diagram illustrating aspects of a method for pace control of immersive content.

FIG. 5 illustrates operations of a process 500 that may be performed by a pace controller to pace immersive content for an immersive display device in response to user input. The process may include other suitable operations not shown, for example content security or rendering operations, as known in the art. The process 500 may initially include retrieving a narrative ruleset 502 from a data source, for example, from a local or remote database for content to be played. Based on the ruleset, the pace controller may determine, at 504, the next content to be played, and may generate a data stream for immersive output of the next content. As the immersive output is provided to the immersive output device, the pace controller may receive, at 506, sensor input that indicates user navigation, viewpoint rotation, other user interaction with the immersive environment, or some combination of such user actions.

At 507, the pace controller may analyze the sensor input and determine, based at least in part on the narrative ruleset, whether or not a scripted event defined by the ruleset is triggered. The scripted event may be, or may include, initiation of an independent, continuous narrative sequence that is encoded in recorded data used for generating AR or VR output. If the pace controller determines that a scripted event has been triggered, the next independent, continuous narrative sequence is determined at 504 and process flow continues. If the pace controller determines that no scripted event is triggered, it may determine, at 508, whether or not to provide a cue or "prompt" to the user to encourage the user to select an event. The decision to prompt may be based at least in part on the pace targets defined by the narrative ruleset for a particular position in the narrative. If the controller determines that a prompt is called for, it may generate a prompt 510. For example, an audio cue, visual cue, or tactile cue may be signaled by the processor, to encourage the user to perform an action (e.g., selecting an object, or looking in a certain direction) that will trigger the next scripted event. If no prompt is called for, process flow may revert to outputting prior content or filler content while receiving further user input, at 506.

Although not shown in FIG. 5 for illustrative simplicity, it should be appreciated that after providing a prompt at 510, process flow may revert to 506/507 to determine whether a trigger has been generated. The process of prompting may be repeated any desired number of times. Between each repetition of a prompt 510, the processor may determine, at 512, whether or not to force the narrative pace. Forcing at 514 is equivalent to making an "artificial" determination that the next scripted event is triggered, as described in connection with box 507 wherein flow reverts to 504. In either case, if there is no next scripted event to select (e.g., play is finished) as determined at 516, the processor may initiate a termination sequence, including, for example, a final scene and ending credits. While details of the process 500 may be added or varied, the process illustrates certain essential aspects of pace control in response to a narrative ruleset and user input.

Scene transformations may create challenges for immersive content generally. Due to the immersive quality, sudden scene transformations or changes of viewpoint may be overly disorienting for the immersed viewer. Accordingly, narrative content may need to be edited differently so as to manage scene and camera angle transitions appropriately for immersive output. Editing techniques may include reducing the quantity and frequency of scene or viewpoint changes, shifting viewpoints gradually and not suddenly unless for specific dramatic effect, using fades or other gradual cues for scene changes that provide a period of visual adjustment and avoid disorienting or nauseating the immersive viewer. In a pace control process 500, such transitions should likewise be managed. Generally, scene changes or forced viewpoint changes should be associated with event group boundaries. Events within a group may be selected to occur within the same scene, or same portion of a scene. Triggering of each event may be related to a view direction of the user, making transitions automatically seamless for the viewer, because the prerecorded event will appear in an area the viewer is already looking towards, whether or not in response to some audible or visible cue. When pacing calls for forcing an event, control of the viewpoint by the user may be temporarily overridden, and the user's focus guided to the portion of the scene where the event is to occur.

Figure 6:
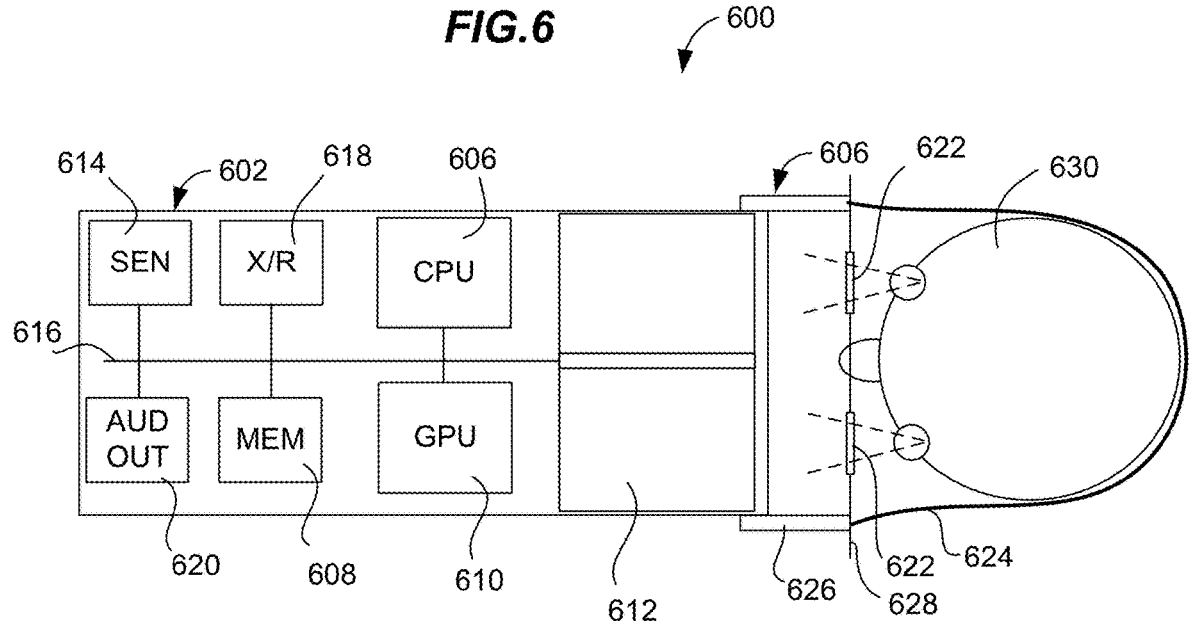
FIG. 6 is a schematic diagram illustrating components of a stereoscopic display device for providing an immersive VR experience.

Any of the features described herein may be executed by an application for providing a 3D environment responsive to user input that produces VR output for an immersive VR headset or the like. FIG. 6 is a diagram illustrating one type of an immersive VR stereoscopic display device 600 that may be provided in various form factors, of which device 600 provides but one example. The innovative methods, apparatus and systems are not necessarily limited to a particular form factor of immersive VR display but may be used in a video output device that enables the user to control a position or point of view of video content playing on the device. Likewise, a VR or AR output device may manage an audio position or point of view of audio content playing on the device. The immersive VR stereoscopic display device 600 represents an example of a relatively low-cost device designed for consumer use.

The immersive VR stereoscopic display device 600 may include a tablet support structure made of an opaque lightweight structural material (e.g., a rigid polymer, aluminum or cardboard) configured for supporting and allowing for removable placement of a portable tablet computing or smartphone device including a high-resolution display screen, for example, an LCD display. This modular design may avoid the need for dedicated electronic components for video output, greatly reducing the cost. The device 600 is designed to be worn close to the user's face, enabling a wide field of view using a small screen size such as typically found in present handheld tablet computing or smartphone devices. The support structure 626 may provide a fixed mounting for a pair of lenses 622 held in relation to the display screen 612. The lenses may be configured to enable the user to comfortably focus on the display screen 612 which may be held approximately one to three inches from the user's eyes.

The device 600 may further include a viewing shroud (not shown) coupled to the support structure 626 and configured of a soft, flexible or other suitable opaque material for form fitting to the user's face and blocking outside light. The shroud may be configured to ensure that the only visible light source to the user is the display screen 612, enhancing the immersive effect of using the device 600. A screen divider may be used to separate the screen 612 into independently driven stereoscopic regions, each of which is visible only through a corresponding one of the lenses 622. Hence, the immersive VR stereoscopic display device 600 may be used to provide stereoscopic display output, providing a more realistic perception of 3D space for the user. Two separate displays can also be used to provide independent images to the user's left and right eyes respectively. It should be appreciated that the present technology may be used for, but is not necessarily limited to, stereoscopic video output.

The immersive VR stereoscopic display device 600 may further comprise a bridge (not shown) for positioning over the user's nose, to facilitate accurate positioning of the lenses 622 with respect to the user's eyes. The device 600 may further comprise an elastic strap or band 624, or other headwear for fitting around the user's head and holding the device 600 to the user's head.

The immersive VR stereoscopic display device 600 may include additional electronic components of a display and communications unit 602 (e.g., a tablet computer or smartphone) in relation to a user's head 630. A support structure 604 (108, FIG. 1) holds the display and communications unit 602 using restraining device 624 that is elastic and/or adjustable to provide a comfortable and secure snug fit, for example, adjustable headgear. When wearing the support 602, the user views the display 612 though the pair of lenses 622. The display 612 may be driven by the Central Processing Unit (CPU) 602 and/or Graphics Processing Unit (GPU) 610 via an internal bus 616. Components of the display and communications unit 602 may further include, for example, a transmit/receive component or components 618, enabling wireless communication between the CPU and an external server via a wireless coupling. The transmit/receive component 618 may operate using any suitable high-bandwidth wireless technology or protocol, including, for example, cellular telephone technologies such as 3rd Generation Partnership Project (3GPP) Long Term Evolution (LTE), Global System for Mobile communications (GSM) or Universal Mobile Telecommunications System (UMTS), and/or a wireless local area network (WLAN) technology for example using a protocol such as Institute of Electrical and Electronics Engineers (IEEE) 802.11. The transmit/receive component or components 618 may enable streaming of video data to the display and communications unit 602 from a local or remote video server, and uplink transmission of sensor and other data to the local or remote video server for control or audience response techniques as described herein.

Components of the display and communications unit 602 may further include, for example, one or more sensors 614 coupled to the CPU 606 via the communications bus 616. Such sensors may include, for example, an accelerometer/inclinometer array providing orientation data for indicating an orientation of the display and communications unit 602. As the display and communications unit 602 is fixed to the user's head 630, this data may also be calibrated to indicate an orientation of the head 630. The one or more sensors 614 may further include, for example, a Global Positioning System (GPS) sensor indicating a geographic position of the user. The one or more sensors 614 may further include, for example, a camera or image sensor positioned to detect an orientation of one or more of the user's eyes. In some embodiments, a cameras, image sensor, or other sensor configured to detect a user's eyes or eye movements may be mounted in the support structure 626 and coupled to the CPU 606 via the bus 616 and a serial bus port (not shown), for example, a Universal Serial Bus (USB) or other suitable communications port. The one or more sensors 614 may further include, for example, an interferometer positioned in the support structure 604 and configured to indicate a surface contour to the user's eyes. The one or more sensors 614 may further include, for example, a microphone, array or microphones, or other audio input transducer for detecting spoken user commands or verbal and non-verbal audible reactions to display output. The one or more sensors may include, for example, electrodes to sense heart rate, a temperature sensor configured for sensing skin or body temperature of the user, or other medical sensors for collecting biofeedback data.

While FIG. 6 diagrams an example of a VR device, it should be appreciated that immersive AR devices may include similar electronic components, except for the display output components. The processor and memory of an AR device will also differ in the software that is operated; VR software is configured to drive a VR output device, while AR software is configured to drive an AR output device. A VR output device may comprise a display screen such as, for example, a conventional LCD or OLED screen that is positioned in the VR headset so as to obscure the user's view of anything except what is displayed on the display screen. In contrast, an AR output device does not obscure the user's view of her surroundings.

Several types of AR output devices are commercially available or under development. In one class of devices, a display screen includes a two-dimensional array of pixels that are either set to a first state in which the pixels are transparent or a second state in which the pixels are opaque. The display screen is worn by the user and positioned such that groups of pixels set to the opaque state display a virtual image, while adjacent pixels transmit the external scene. This results in the virtual image being overlain in the scene, from the user's point of view. In another class of devices, a computer-generated image is projected onto a semitransparent screen or lens that is worn in a manner similar to the VR headset described above. The screen or lens is made of a one-way transmissive material that passes light from one side and reflects from the other direction in one or more layers. Light for forming the augmented reality image is projected from a DLP or the like from one or more emitters placed near the user inside of the headset. In a third class of AR devices, one or more video cameras mounted on the headset capture the external scene nearly as the user would see it were the view not blocked by a fully opaque screen in the headset, and combine video from the cameras with computer-generated content in real time to create an augmented display. In a fourth type of device, a laser projector or projector mounted to the user's head and directed to the user's eyes projects images directly on the user's eyes, making the retinas the only screen on which the augmented content is displayed. Examples of devices for immersive and non-immersive AR output include the Hololens™ device under development by Microsoft™ Corporation, Google Glass™ by Google Inc., Digital Lightfield™ by Magic Leap, Inc. of Florida; Space Glasses™ by Meta Company of Portola Valley, Calif., and castAR™ glasses by of castAR of Palo Alto, Calif.

For immersive VR, AR or similar output modalities, the story content of a movie or the like may be enhanced, without eliminating the essence of scripted entertainment that a participant or user (who is visually, aurally and cognitively immersed) can more or less passively enjoy. For example, allowing users to move the viewpoint to see items occluded in the main view as a scene unfolds may enable such users to absorb dramatic details that enhance understanding of the plot, add emotional impact, foreshadow events to come, or otherwise enhance enjoyment of a scripted storyline. An example of foregoing is enhancing story telling by user-selected depth of focus about feedback loops among an interactive VR narrative (or whatever form the narrative takes), and at least two sense modalities plus one cognitive item.

As used herein, "focus distance" refers to distance between the camera and the location in the scene having the sharpest focus. The focus distance increases as the location of sharpest focus moves further from the camera. In traditional filmmaking, the location of sharpest focus is in the scene in front of the camera and can often be adjusted by the camera operator or director to isolate a viewer's attention to the particular element or subject in the scene. In both 2D monoscopic imaging and 3D stereoscopic imaging, the lenses in the viewer's eyes are focused on the display or screen on which the viewer is looking. In 2D monoscopic imaging, the viewer's eyes are also converged on the screen or display itself, while in 3D stereoscopic imaging the viewer's eyes will converge in front of screen, at the screen or behind the screen, depending on the location of the image of the object that the viewer is looking at. Stereoscopic content is often created with camera settings that make the entire scene in acceptable focus which allows the user to look around the scene at any object, and while this may sometimes provide an acceptable viewing experience and allow the user to rapidly look at different objects in the scene, it does not produce a result that mimics viewing physical objects in reality. When a human views physical objects in the real world, the human eye is focused and converged at the same location in space where the physical objects exist, which makes the objects in the scene that are far away from this focus and convergence location point blurry (lacking sharp focus). If the convergence location of the eyes of the viewer wearing the VR headset can be detected with a camera or sensor within the VR headset that is imaging the viewer's eyes, then a more realistic virtual experience can be created if the depth of field in the virtual scene were to be limited and centered at this convergence distance by setting the virtual camera's focus distance to this detected convergence distance. Additionally, in order to isolate the viewer's attention to particular regions of the scene for narrative purposes, the focus distance in the virtual camera can be set to correspond to particular regions of the scene. The depth of field can be narrowed by using a larger lens aperture on the camera (smaller lens f-number) to further isolate a particular object or region in the scene.

The two sense modalities may include sight and sound. Thinking of the head-mounted display+audio examples, the user sees some field of view and hears some aurally presented sound field. The cognitive item relates to understanding a language, perhaps in a dialog, a voice-over, or some other narrative element. In each case, the narrative can influence or be influenced by the sense modalities and/or the cognition. For example, a visual event (for example, appearance of a bright light in an otherwise uniformly dim background) may occur somewhere in the far-left distance of the presented visual field. This can draw the user's attention and actual visual focus. For further example, an aural event (for example, a loud sound in an otherwise uniformly low volume background) may occur somewhere in the right far distance of the presented sound field. This can also draw the user's attention and focus. For yet further example, an announcer (for example, a voice-over in a game involving an attack on a castle, which the user is inside of) may remark "And now, the threatened attack begins over the central castle wall." This may draw both the user's attention and visual focus, either in anticipation of the attack, or as the marauders appear at the central parapets.

In addition, or in the alternative, the participant's visual, aural or cognitive focus may influence the narrative. For example, the user focuses on the left far distance of the presented visual field—for good reasons or none—and since the biometric feedback mechanism in the head-mounted display can detect this focus, an event may be caused to occur there, or nearby, or in a completely different part of the visual field if this somehow advances the narrative. For further example, the user focuses his or her aural attention some place in the sound field, perhaps craning his or her neck or otherwise signaling this aural focus, and an aural event can be caused to occur there, or nearby, or in a completely different part of the sound field if this somehow advances the narrative. For yet a further example, a user may react to some event(s) by either uttering some reflexive sound (e.g. "Oh!" or "Aha" or some such), or by actually stating or otherwise saying something (e.g. "I can see them coming over the hill," regardless of whether there actually is something to see coming over the hill), and the upshot can be that indeed something happens at the crest of the hill, or nearby, or in a completely different place if that somehow advances the narrative.

Events or visual/aural/cognitive objects of interest may coincide in many cases. Or they may not, as differences in what the visual, aural and cognitive fields present may be part of what builds tension or some other worthwhile advancement for the narrative. Sometimes a dialog or a voice-over may cross over from cognitive to aural stimulus, i.e. the whispered dialog may be coming from some place that attracts attention not only because of what the words mean, but simply because the sounds come from that point of origin. Still, the overriding consideration is that there are at least three types of events—visual, aural and cognitive (and blends thereof)—that can either prompt responses in the participant, or that can occur as a consequence of the participant's visual, aural and/or cognitive focus. The present application discloses technical means for accomplishing these and other forms of interactivity with VR content.

Sensor output from the one or more sensors may be processed locally by the CPU to control display output, and/or transmitted to a server for processing by the server in real time, or for non-real time processing. As used herein, "real time" refers to processing responsive to user input that controls display output without any arbitrary delay; that is, that reacts as soon as technically feasible for the AR or VR system in use. "Non-real time" refers to batch processing or other use of sensor output that is not used to provide immediate control input for controlling the display, but that may control the display after some arbitrary amount of delay.

Components of the display and communications unit 602 may further include, for example, an audio output transducer 620, for example a speaker or piezoelectric transducer in the display and communications unit 602 or audio output port for headphones or other audio output transducer mounted in headgear 624 or the like. The audio output device may provide surround sound, multichannel audio, so-called 'object oriented audio', or other audio track output accompanying a stereoscopic immersive VR video display content. Components of the display and communications unit 602 may further include, for example, a memory device 608 coupled to the CPU 606 via a memory bus. The memory 608 may store, for example, program instructions that when executed by the processor cause the apparatus 600 to perform operations as described herein. The memory 608 may also store data, for example, audio-video data in a library or buffered during streaming operations. Further details regarding generation and use of VR environments may be as described in U.S. Provisional Patent Application Ser. No. 62/088,496, filed Dec. 5, 2014, which is incorporated herein in its entirety by reference.

Figure 7:
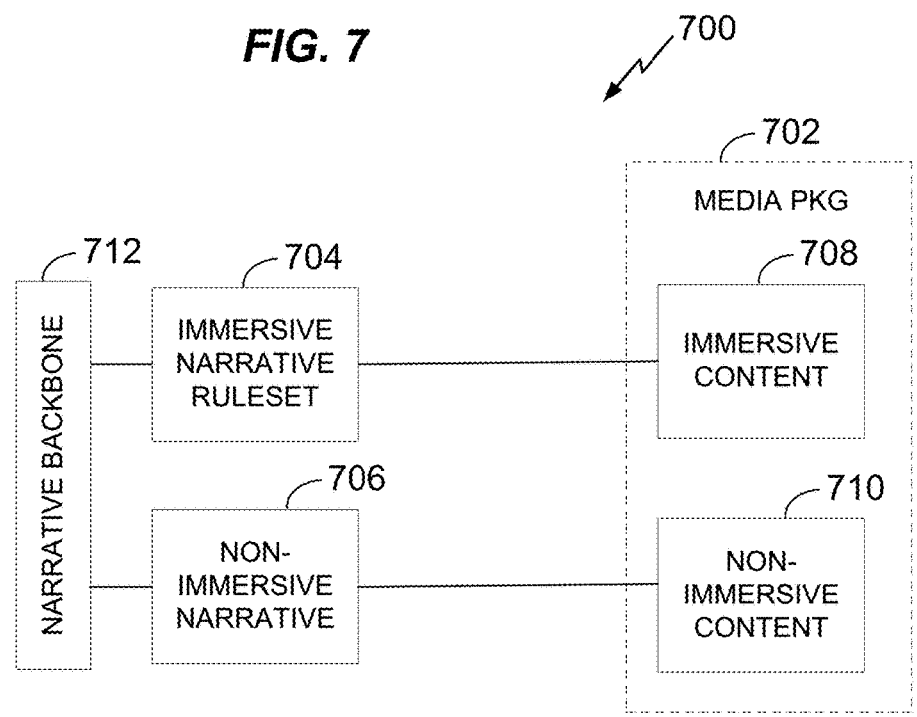
FIG. 7 is a block diagram illustrating aspects of a media package holding audio-video data with a predetermined narrative with additional content coordinated with the predefined narrative and configured for providing an alternative output.

Narrative content represented by, for example, a motion picture script, may be produced for both immersive and non-immersive output devices. Referring to FIG. 7, general aspects 700 of packaging immersive and non-immersive content in a media package 702 are illustrated. As used herein, "packaging" data in a medium means preparing encoded data by encoding the data for writing to the medium, and writing the encoded data to the medium, thereby providing the media package 702. The media package 702 may be, or may include, a particular article, such as computer-readable optical disk or memory device. In the alternative, the package 702 may be, or may include, a set of data maintained on a server for which access rights are granted to a particular user account. In either case, the media package 702 is designed to appeal to a consumer desiring to obtain access to immersive content 708 and non-immersive content 710 on different devices. For example, the consumer may desire to watch non-immersive content 710 on a video display screen of a mobile or larger device, and immersive content 708 using a head set or other device that provides access to VR or AR content.

The non-immersive content 710 may be recorded according to a non-immersive narrative 706, for example, a traditional linear script. The immersive content 708 may be recorded according to an immersive narrative ruleset 704, such as, for example, a rule set as described herein above. Both the immersive narrative ruleset 704 and the non-immersive narrative 706 may be an expression of a narrative backbone. For example, the narrative backbone may include the entire narrative ruleset 704, while the non-immersive narrative 706 may be a subset of the backbone 712, containing only selected critical narrative events arranged in a particular narrative sequence.

Figure 8:
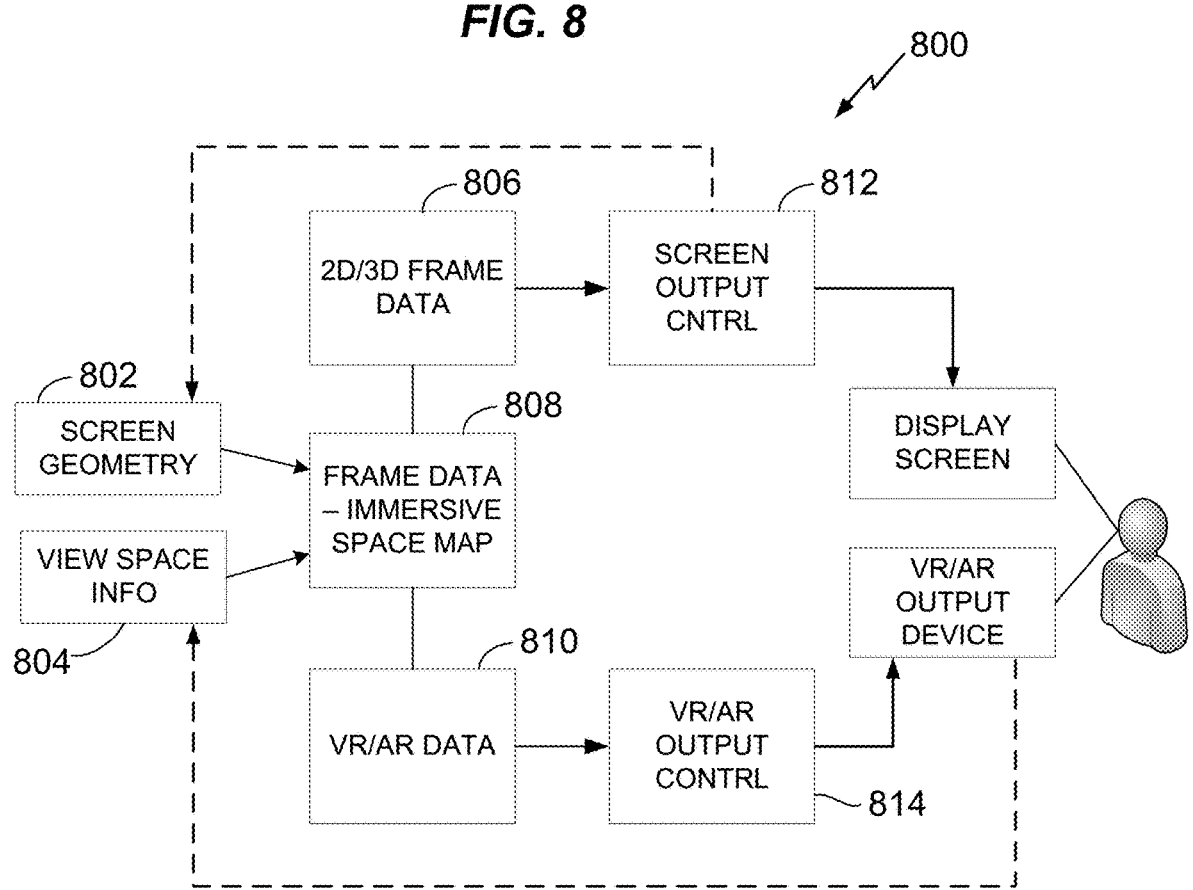
FIG. 8 is a block diagram illustrating aspects of a content display system including coordinated output of immersive and non-immersive content.

In an aspect, immersive content 708 and non-immersive content 710 may be coordinated for consumption by playback in parallel. FIG. 8 illustrates aspects of parallel consumption 800 using coordinated output devices. The different output devices may obtain content from a media package 702, for example from a content server via a local area network or wireless local area network. A first output device for non-immersive content may include a 2D display screen 816. A second output device 818 may be configured for providing AR or VR. The different output devices 816, 818 may be in use by the same user 820, or by different users (not shown) occupying a shared space.

A data source may supply at least three types of data from a media package: 2D or stereographic 3D frame data 806, VR or AR data 810, and a map 808 that relates the frame data 806 and the VR/AR data 810. Use of the map 808 may change as a function of screen geometry data 803 from the screen output controller 812, and geometry data defining the view space 804, for example a position and orientation of the viewer 820 relative to the display screen 816 from sensors in the VR/AR output device 818. The screen output controller 812 may play frame data in a conventional fashion for output on the display screen 816. While viewing the output on the display screen 816, the user may also view output on the VR/AR device 818. In a VR mode, the immersive output device 818 may duplicate the view on the screen 816 and add additional surrounding imagery and interactive content. In an AR mode, the immersive output device 818 may augment the display 816 with surrounding imagery or interactive content. Using VR or AR content keyed to non-immersive content in a media package, a suitably equipped user can thus greatly expand the viewing area and number of interactive objects that can be experienced in connection with the narrative content, relative to the content displayed on the display screen 816. The VR/AR output controller 814 may keep the VR or AR output synchronized with play of the frame data 806, via the map 808 and geometry data 802, 804.

Figure 9:
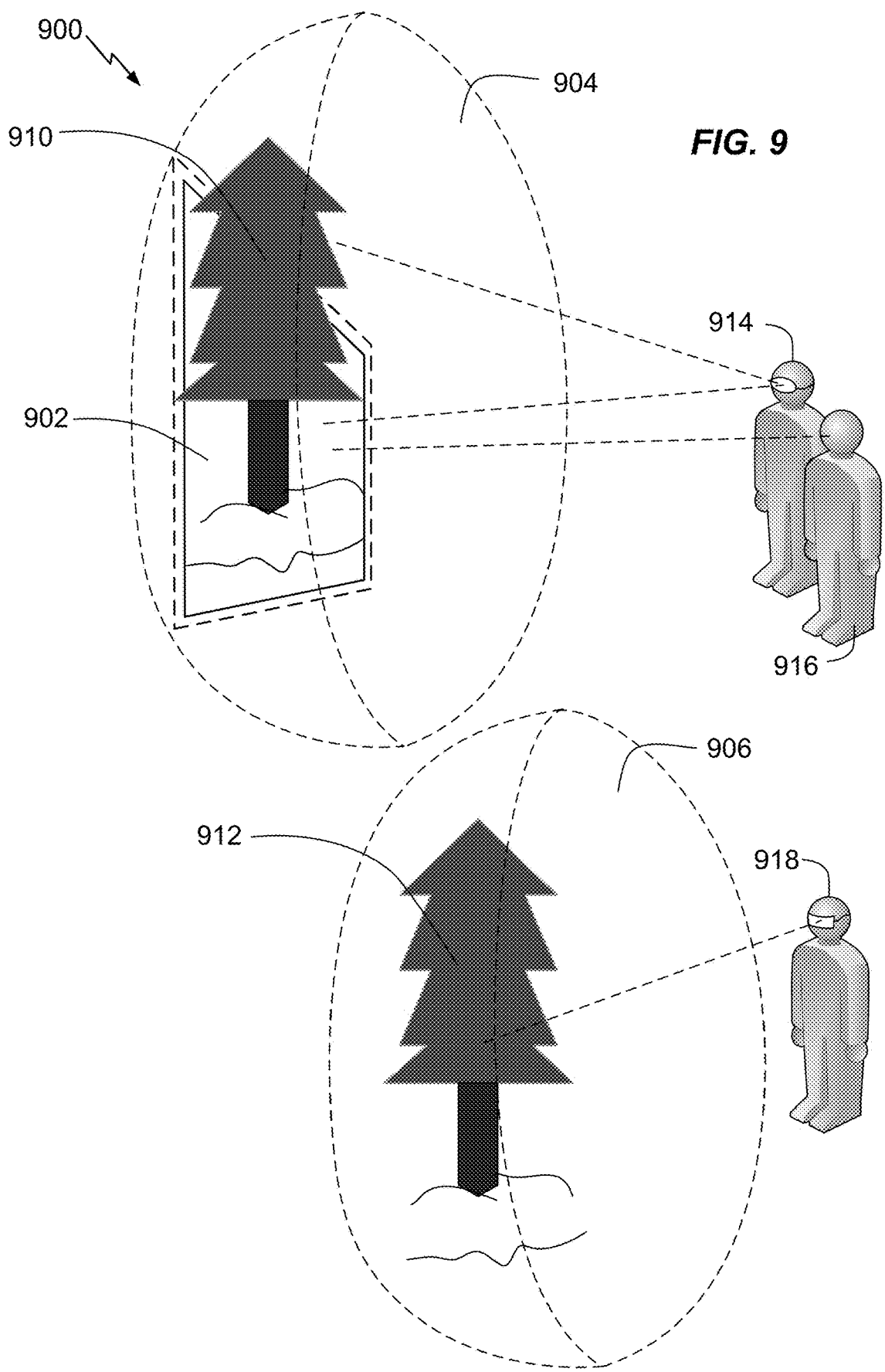
FIG. 9 is a schematic diagram illustrating aspects of viewing coordinated immersive and non-immersive content from the perspective of different viewers.

FIG. 9 illustrates aspects of augmented content using AR or VR in a viewing space 900 shared by multiple users 914, 916 and 918. A first user 914 hearing an AR headset views a content object 910 ("tree") partially on the screen 902 and partially in an augmented space 904 surrounding the screen 902. A second user 916 is viewing the screen 902 with "naked eyes," and sees only the partial view of the object 910 as depicted on the screen 902 and sees nothing except the actual physical surroundings (e.g., a movie theater) in the area surrounding the screen 902. A third user 918 using a VR headset does not see the screen 902 at all. Instead, the third user sees an equivalent content object 912 for the object 910 displayed in the screen 902. The object 912 may be located in the user's VR space 906 in a position relative to the user 918 that is closely equivalent to the position of the object 910 relative to the users 914, 916. Hence, all users 914, 916 and 918 may share the experience of at least the content playing on the screen 902, while users 914 and 918 equipped with AR or VR output devices can enjoy enhanced content at the same time that non-equipped user 916 is matching content on the screen 902 only.

Figure 10:
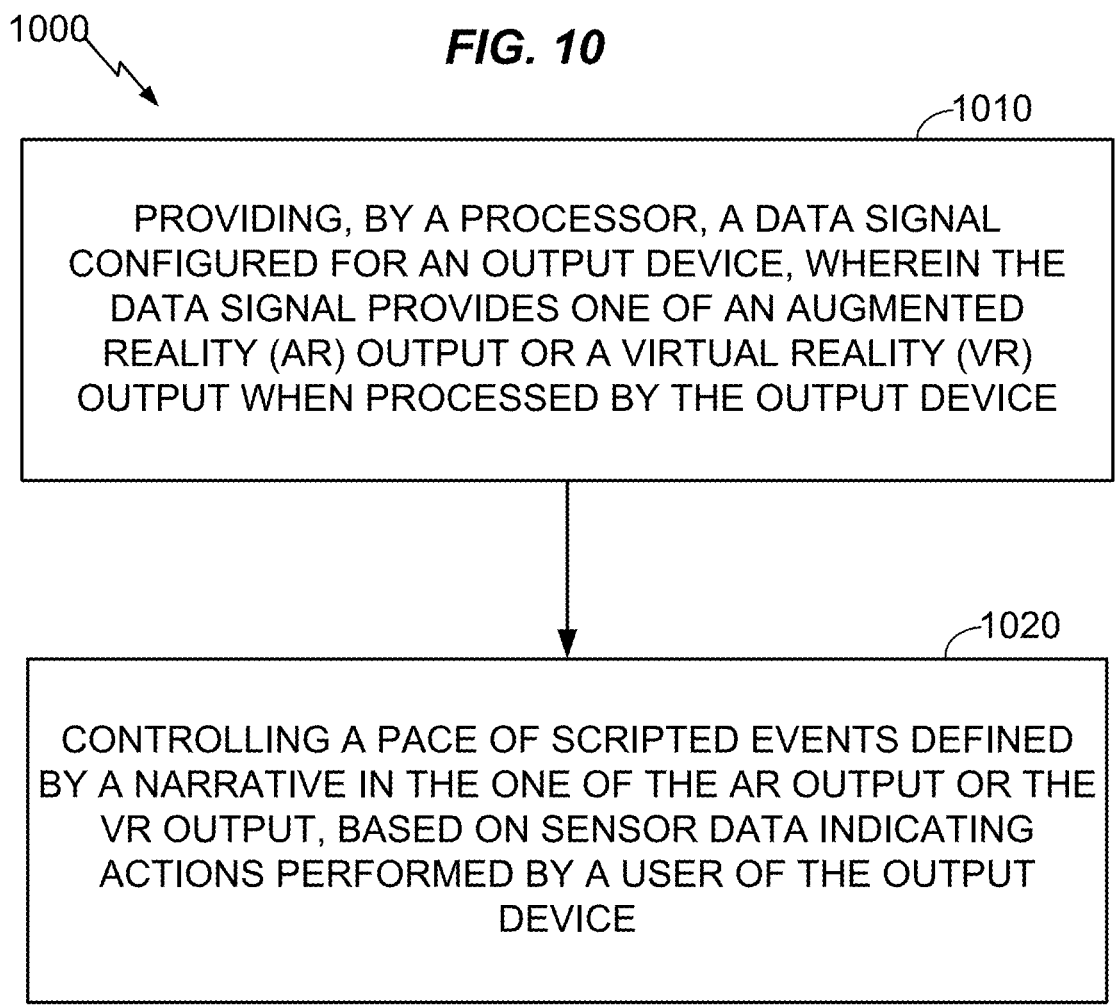
FIG. 10 is a flow chart illustrating a method for controlling a pace of scripted events in VR output.
Figure 11:
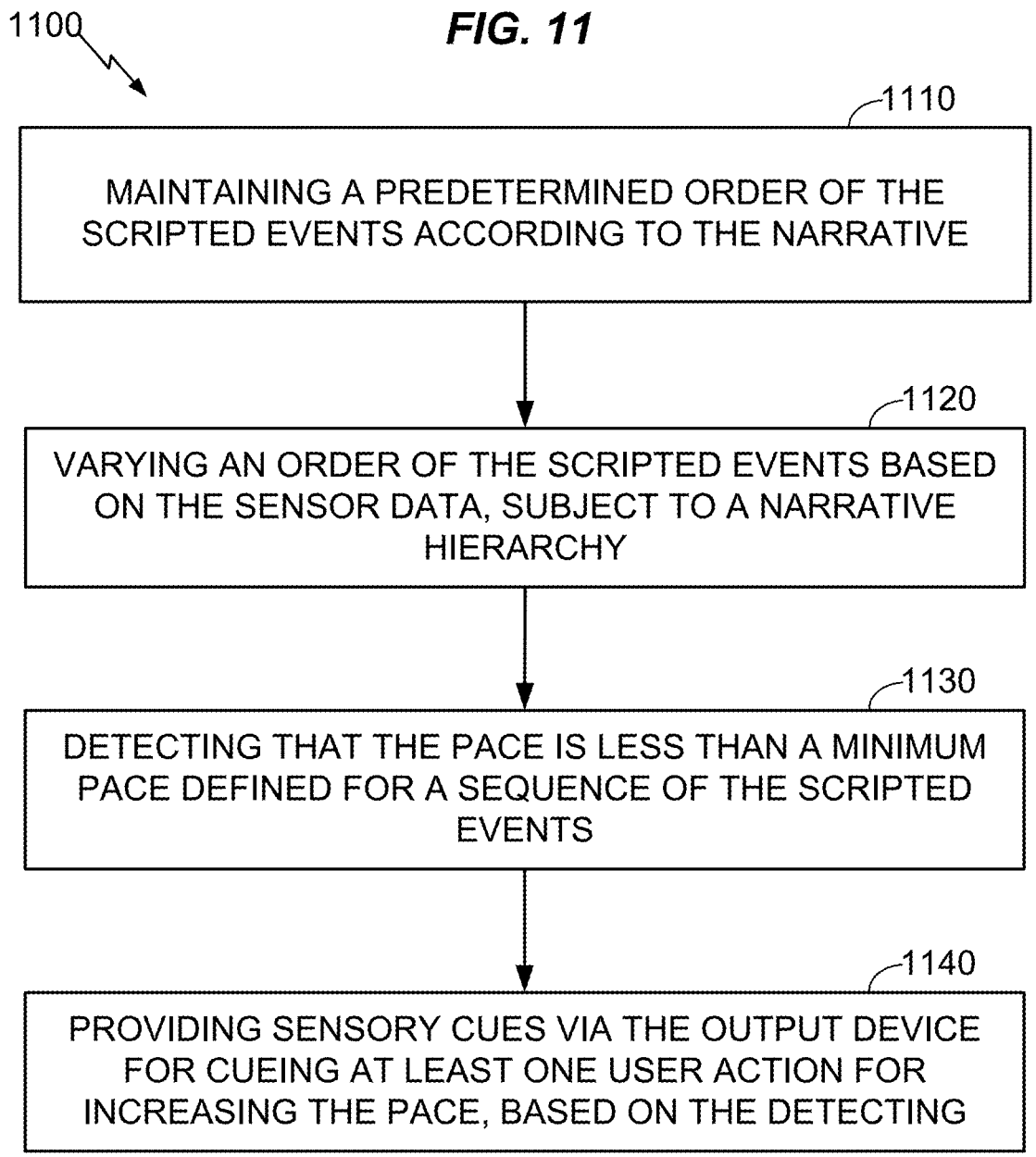
FIGS. 11-12 are flow charts illustrating further optional aspects or operations of the method diagrammed in FIG. 10.
Figure 12:
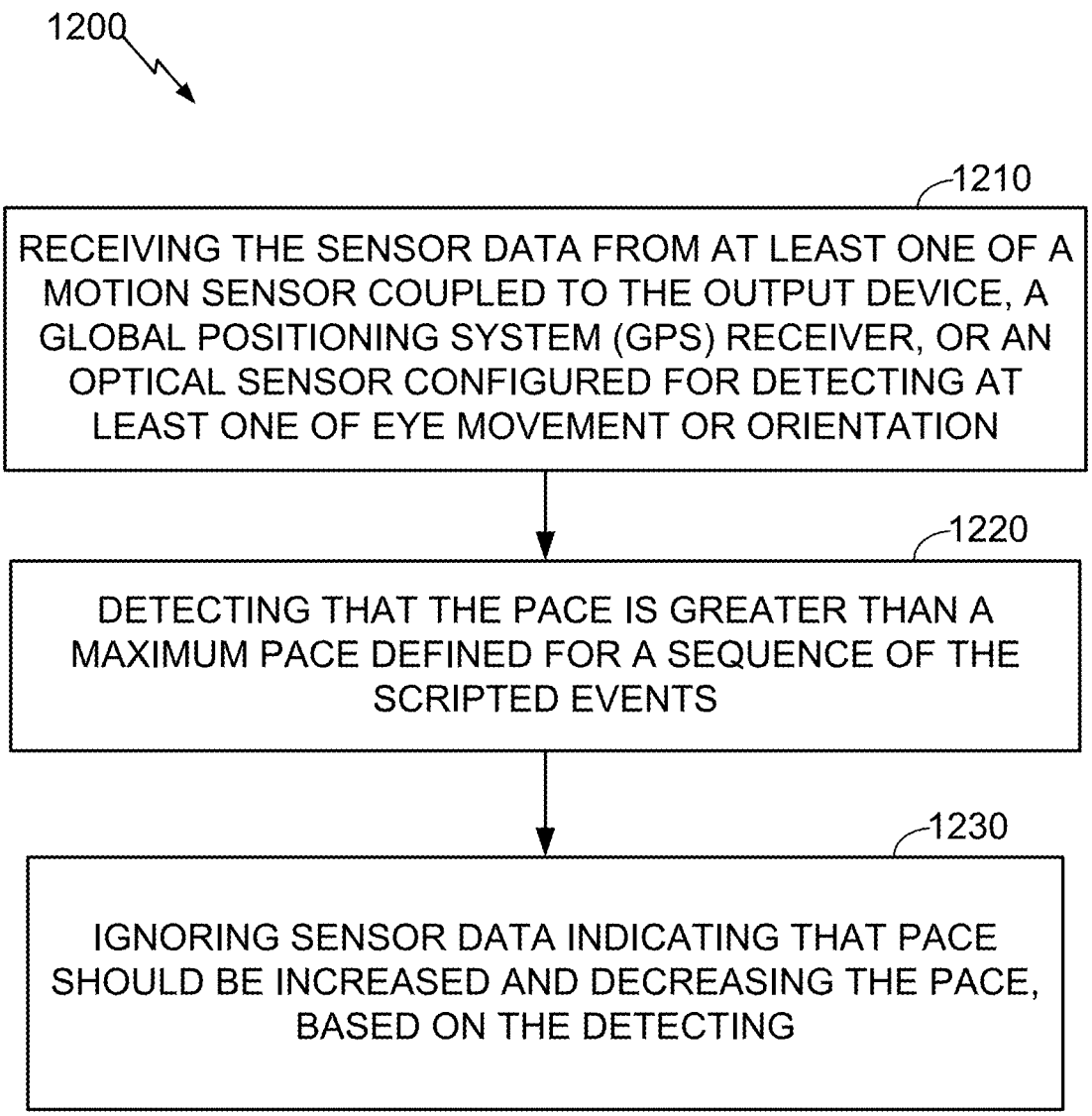

In view the foregoing, and by way of additional example, FIGS. 10-12 show aspects of a method or methods of pace control, as may be performed by pace controller for VR or AR output device or other computing apparatus described herein. Referring to FIG. 10, a computer-implemented method 1000 may include, at 1010, providing, by a processor, a data signal configured for an output device, wherein the data signal provides one of an augmented reality (AR) output or a virtual reality (VR) output when processed by the immersive output device. An AR output device or VR output device may be, or may include, any device as described herein, or other device capable of providing an immersive video output. The method 1000 may further include, at 1020, controlling a pace of scripted events defined by a narrative in the one of the AR output or the VR output, based on sensor output indicating actions performed by a user of the immersive output device. Pace control may further include more detailed operations, as described herein above in connection with FIGS. 3-5, or in connection with FIGS. 11 and 12 below. Scripted events may include activities of a character appearing in the one of the AR output or the VR output, or of other objects in a scene, including both animate or inanimate objects.

The method 1000 may include any one or more of additional operations 1100 or 1200, shown in FIGS. 11 and 12, in any operable order. Each of these additional operations is not necessarily performed in every embodiment of the method, and the presence of any one of the operations 1100 or 1200 does not necessarily require that any other of these additional operations also be performed.

Referring to FIG. 11, the method 1000 may further include, at 1110, maintaining a predetermined order of the scripted events according to the narrative. In the alternative, or in addition, the method 1000 may further include, at 1120, varying an order of the scripted events based on the sensor output, subject to a narrative hierarchy. In an aspect, the narrative hierarchy defines narrative relationships between groups of events and permits events within each group to occur in any chronological order based on the sensor output. Further aspects of narrative hierarchies are described above in connection with FIG. 3.

In another aspect, the method 1000 may further include, at 1130, detecting that the pace is less than a minimum pace defined for a sequence of the scripted events. The method 1000 may further include, at 1140, providing sensory cues via the immersive output device for cueing at least one user action for increasing the pace, based on the detecting. For example, a sensory cue may include an audible cue or a visible cue. Cueing may be used instead of, or in addition to, forcing pace of events to occur within a minimum timeframe. An example of mixed cueing and pace forcing is described above in connection with FIG. 5.

Referring to FIG. 12, the method 1000 may further include, at 1210, receiving the sensor output from at least one of a motion sensor coupled to the AR or VR output device, a Global Positioning System (GPS) receiver, or an optical sensor configured for detecting at least one of eye movement or orientation. The sensor output may indicate an area of focus of the user based on a view direct and/or focus depth. If the area of focus persists within a predefined region for a defined period of time, detection of the persistence based on the sensor output may be used to trigger playback of a prerecorded event sequence.

In another aspect, the method 100 may further include, at 1220, detecting that the pace of narrative elements is greater than a maximum pace defined for a sequence of the scripted events. In other words, a pace control processor may detect that a user is moving through the narrative chain too quickly, or more quickly than desired for a corresponding portion of scripted events. In response to this detecting, the method 100 may further include, at 1230, comprising ignoring sensor output indicating that pace should be increased and decreasing the pace, based on the detecting.

Figure 13:
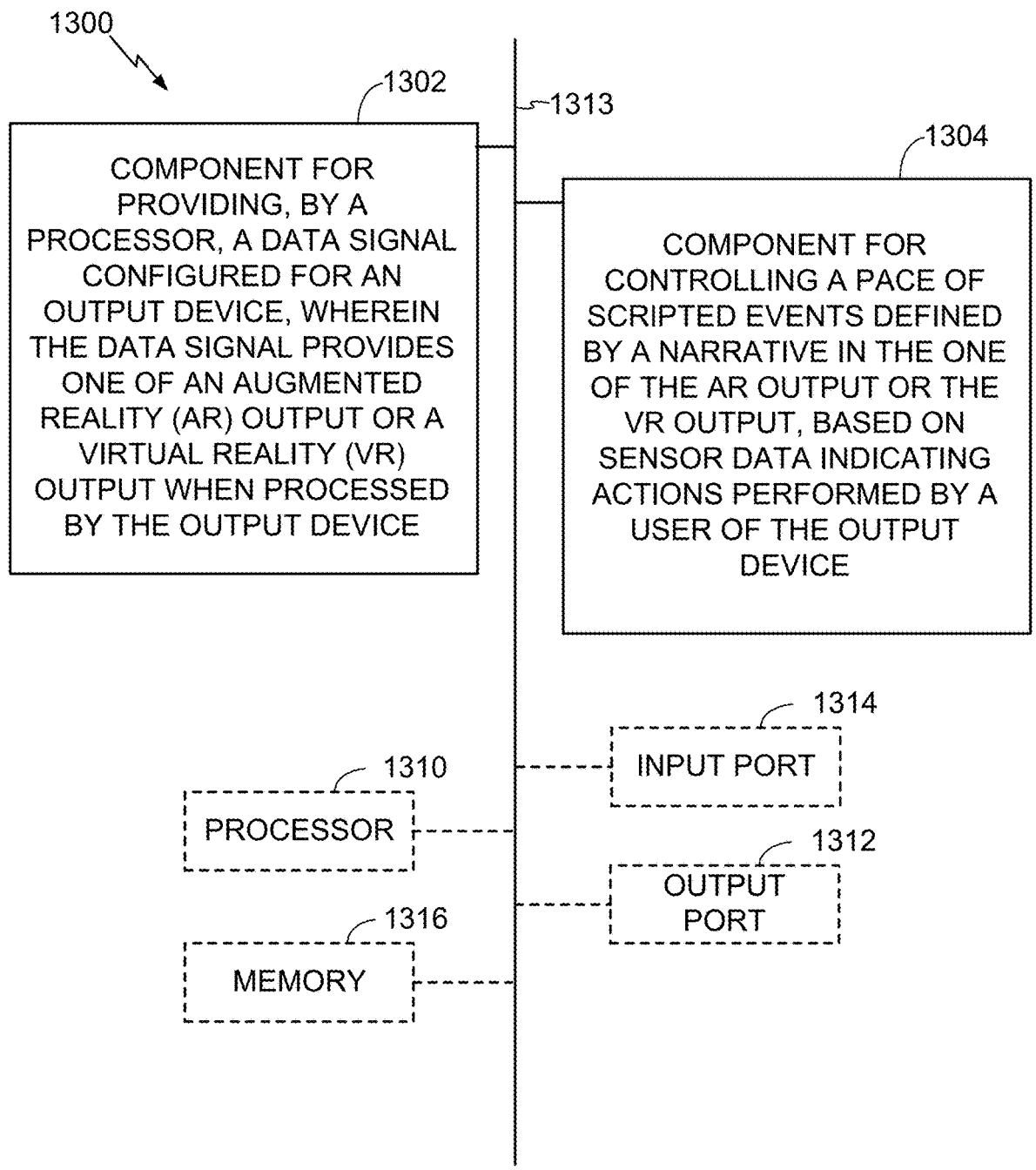
FIG. 13 is a conceptual block diagram illustrating components of an apparatus or system for controlling a pace of scripted events in VR output.

FIG. 13 is a conceptual block diagram illustrating components of an apparatus or system 1300 for pace control as described herein. The apparatus or system 1300 may include additional or more detailed components as described herein. For example, the processor 1310 and memory 1316 may contain an instantiation of a 3D environment application as described herein above. As depicted, the apparatus or system 1300 may include functional blocks that can represent functions implemented by a processor, software, or combination thereof (e.g., firmware).

As illustrated in FIG. 13, the apparatus or system 1300 may comprise an electrical component 1302 for providing a data signal configured for an output device, wherein the data signal provides one of AR output or a VR output when processed by the immersive output device. The component 1302 may be, or may include, a means for providing the data signal. Said means may include the processor 1310 coupled to the memory 1316, and to the input device 1314, the processor executing an algorithm based on program instructions stored in the memory. Such algorithm may include a sequence of more detailed operations, for example, determining a view direction based on sensor output from the immersive output device, selecting a visible area of a scene based on the view direction, encoding data representing the visible area for a display of the immersive output device, and transmitting encoded data to the immersive output device.

The apparatus 1300 may further include an electrical component 1304 for controlling a pace of scripted events defined by a narrative in the one of the AR output or the VR output, based on sensor output indicating actions performed by a user of the immersive output device. The component 1304 may be, or may include, a means for controlling the pace based on the sensor output. Said means may include the processor 1310 coupled to the memory 1316, and to the input device 1314, the processor executing an algorithm based on program instructions stored in the memory. Such algorithm may include a sequence of more detailed operations, for example, and one or more of the more detailed operations described in connection with FIG. 5, or otherwise described above.

The apparatus 1300 may optionally include a processor module 1310 having at least one processor, in the case of the apparatus 1300 configured as a data processor. The processor 1310, in such case, may be in operative communication with the modules 1302-1304 via a bus 1312 or similar communication coupling. The processor 1310 may effect initiation and scheduling of the processes or functions performed by electrical components 1302-1304.

In related aspects, the apparatus 1300 may include a network interface module (not shown) operable for communicating with a content server over a computer network. In further related aspects, the apparatus 1300 may optionally include a module for storing information, such as, for example, a memory device/module 1316. The computer readable medium or the memory module 1316 may be operatively coupled to the other components of the apparatus 1300 via the bus 1312 or the like. The memory module 1316 may be adapted to store computer readable instructions and data for effecting the processes and behavior of the modules 1302-1304, and subcomponents thereof, or the processor 1310, or the method 1000 and one or more of the additional operations 1100 or 1200 disclosed herein. The memory module 1316 may retain instructions for executing functions associated with the modules 1302-1304. While shown as being external to the memory 1316, it is to be understood that the modules 1302-1304 can exist within the memory 1316.

The apparatus 1300 may include an output port for a VR or AR output device 1312. The output port may comprise a wireless transmitter, or a wired transmitter. In addition, the apparatus 1300 may include an input port 1314 for receiving a signal from one or more sensors of a VR output device or an AR output device. The input port may comprise a wireless receiver, or a wired receiver.

In view the foregoing, and by way of additional example with respect to co-provisioning of immersive and non-immersive content, FIGS. 14-16 show aspects of a method or methods of packaging VR data, as may be performed by a production device for VR or AR content or other computing apparatus described herein. Referring to FIG. 14, a method 1400 may include, at 1410, configuring, by at least one computer, audio-video data for providing a virtual reality (VR) output when processed by an output device, wherein the VR output is organized according to a predefined narrative.

The method 1400 may further include, at 1420, packaging the audio-video data in a computer-readable medium with additional content coordinated with the predefined narrative and configured for providing an alternative output. Further details of the method 1400 may be as described above in connection with FIGS. 1 and 7-9.

The method 1400 may include any one or more of additional operations 1500 or 1600, shown in FIGS. 15 and 16, in any operable order. Each of these additional operations is not necessarily performed in every embodiment of the method, and the presence of any one of the operations 1500 or 1600 does not necessarily require that any other of these additional operations also be performed.

Referring to FIG. 15, the method 1400 may further include, at 1510, configuring the additional content for providing the alternative output. In an aspect, the alternative output comprises audio-video output that is not VR output. For example, as shown at block 1520, the additional content may be configured for one or more of stereoscopic 3D output, 2D output, or AR output. For further example, the method 1400 may further include, at 1530, configuring the additional content to simulate a VR output when used in conjunction with at least one of two-dimensional (2D) video output or stereoscopic 3D output. An example of this type of supplemental AR content is shown at FIG. 9, 904.

Referring to FIG. 16, the method 1400 may further include, at 1610, configuring the audio-video data and the additional content to play at different, non-overlapping times in a sequence. In embodiments wherein the alternative output comprises real-time rendered video, the method 1400 may further include, at 1620, configuring the alternative output as real-time rendered video for a 3D game engine.

In other aspects, the method 1400 may further include, at 1630, configuring the additional content as a duplicate of the predefined narrative. For example, the additional content may duplicate a narrative of the VR content in another format, such as in AR output, stereoscopic 3D, or 2D. In an alternative, or in addition, the method 1400 may further include, at 1640, configuring the additional content as a complementary non-duplicate of the predefined narrative. In another aspect, the packaging further comprises recording positional audio data in the computer-readable medium, wherein the positional audio data is configured to cause at least one of mono, stereo, multichannel or object-oriented audio output when provided to the immersive output device.

Figure 17:
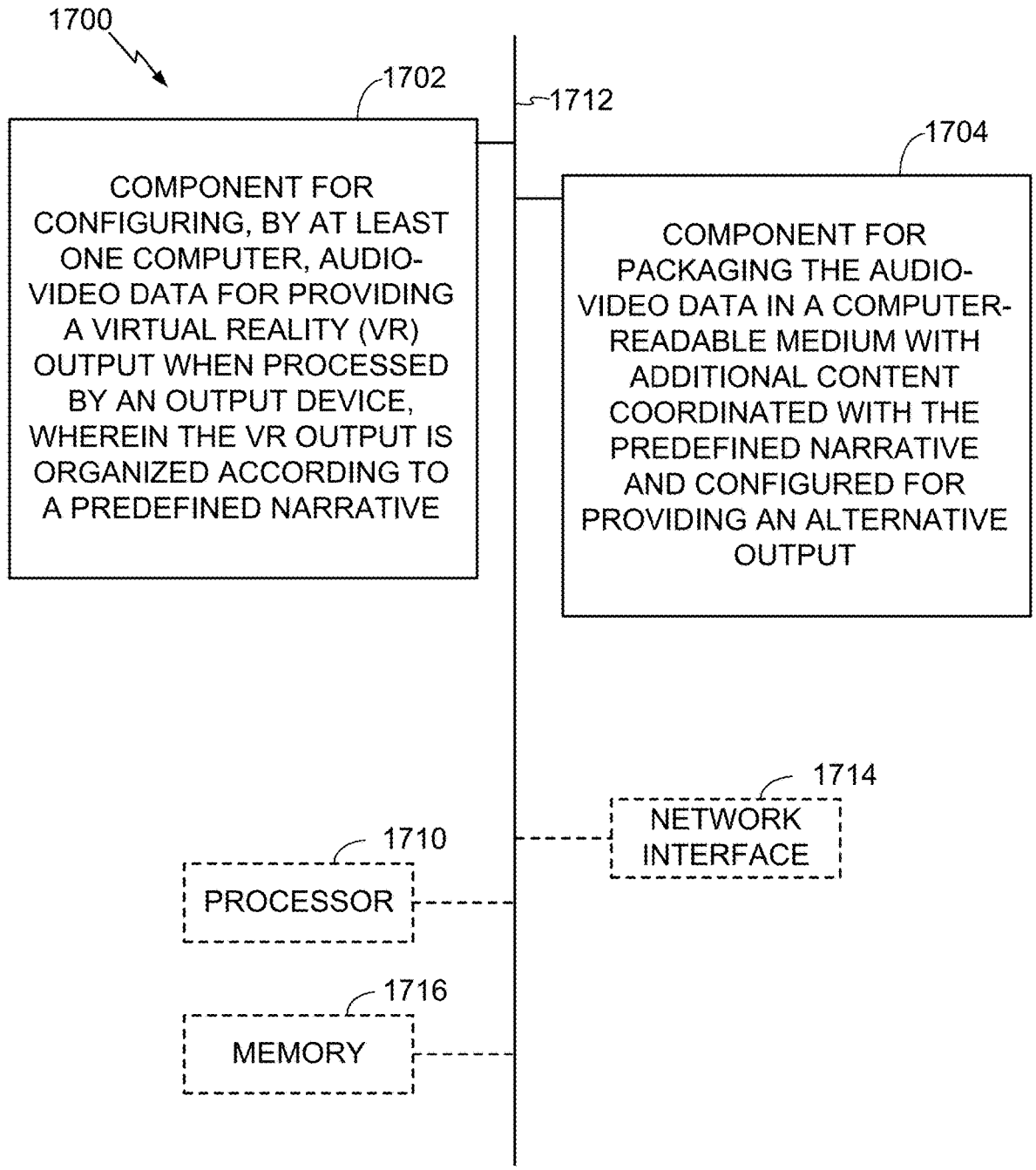
FIG. 17 is a conceptual block diagram illustrating components of an apparatus or system packaging immersive VR content with related alternative content.

FIG. 17 is a conceptual block diagram illustrating components of an apparatus or system 1700 for packaging VR content as described herein. The apparatus or system 1700 may include additional or more detailed components as described herein. As depicted, the apparatus or system 1700 may include functional blocks that can represent functions implemented by a processor, software, or combination thereof (e.g., firmware).

As illustrated in FIG. 17, the apparatus or system 1700 may comprise an electrical component 1702 for configuring, by at least one computer, audio-video data for providing a VR output when processed by an output device, wherein the VR output is organized according to a predefined narrative. The component 1702 may be, or may include, a means for configuring VR output data. Said means may include the processor 1710 coupled to the memory 1716, the processor executing an algorithm based on program instructions stored in the memory. Such algorithm may include a sequence of more detailed operations, for example, determining a VR output format for audio-video content, encoding the audio-video content data for the VR output format, and recording the encoded audio-video content data with metadata for defining VR control parameters.

The apparatus 1700 may further include an electrical component 1704 for packaging the audio-video data in a computer-readable medium with additional content coordinated with the predefined narrative and configured for providing an alternative output. The component 1704 may be, or may include, a means for packaging the audio-video data with additional content. Said means may include the processor 1710 coupled to the memory 1716, the processor executing an algorithm based on program instructions stored in the memory. Such algorithm may include a sequence of more detailed operations, for example, and one or more of the more detailed operations described in connection with FIGS. 14-15, or otherwise described above.

The apparatus 1700 may optionally include a processor module 1710 having at least one processor, in the case of the apparatus 1700 configured as a data processor. The processor 1710, in such case, may be in operative communication with the modules 1702-1704 via a bus 1712 or similar communication coupling. The processor 1710 may effect initiation and scheduling of the processes or functions performed by electrical components 1702-1704.

In related aspects, the apparatus 1700 may include a network interface module (not shown) operable for communicating with a content server over a computer network. In further related aspects, the apparatus 1700 may optionally include a module for storing information, such as, for example, a memory device/module 1716. The computer readable medium or the memory module 1716 may be operatively coupled to the other components of the apparatus 1700 via the bus 1712 or the like. The memory module 1716 may be adapted to store computer readable instructions and data for effecting the processes and behavior of the modules 1702-1704, and subcomponents thereof, or the processor 1710, or the method 1400 and one or more of the additional operations 1500 or 1600 disclosed herein. The memory module 1716 may retain instructions for executing functions associated with the modules 1702-1704. While shown as being external to the memory 1716, it is to be understood that the modules 1702-1704 can exist within the memory 1716.

The apparatus 1700 may include a network interface component 1714 for distributing packaged content to other devices of a communications and/or computer network. In alternative embodiments, the apparatus may include a port to a device for recording the content and alternative content in a non-transitory computer-readable medium.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Operational aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, DVD or Blu-Ray™ disc or other optical medium, solid-state storage device (SSD), or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Furthermore, the one or more versions may be implemented as a method, apparatus, or article of manufacture using standard programming and/or engineering techniques to produce software, firmware, hardware, or any combination thereof to control a computer to implement the disclosed aspects. Non-transitory computer readable media can include but are not limited to magnetic storage devices (e.g., hard disk, floppy disk, magnetic strips . . . ), optical disks (e.g., compact disk (CD), digital versatile disk (DVD) . . . ), Blu-Ray™ disc, smart cards, flash memory devices (e.g., card, stick), and solid-state storage devices. Of course, those skilled in the art will recognize many modifications may be made to this configuration without departing from the scope of the disclosed aspects.

The previous description of the disclosed aspects is provided to enable any person skilled in the art to make or use the present disclosure. Various modifications to these aspects will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers.

What is claimed is:

1. A method for presenting an immersive content in virtual reality to a user of an immersive output device, the method comprising:

providing, by a processor, a data signal configured for the immersive output device, wherein the data signal provides one of an augmented reality (AR) output or a virtual reality (VR) output when processed by the immersive output device, the data signal comprising a plurality of scripted events grouped in one or more event groups, and a narrative ruleset defining a chain of event groups, wherein each event group comprises at least one critical event and a number of optional events, the number of optional events being zero or more;

receiving a sensor input from a sensor configured to detect at least one of eye movement or orientation indicating a user navigation, a viewpoint rotation of the user, a user interaction with the immersive content, a view direction of the user, a focus depth of the user, or a combination thereof;

controlling a narrative pace of the scripted events defined by the narrative ruleset, based on the received sensor input, wherein the processor generates continuous video based on when the scripted events occur; and maintaining a predetermined order of the scripted events according to the narrative ruleset;

wherein the maintaining comprises varying an order of the scripted events based on the sensor input, subject to a narrative hierarchy, wherein the narrative hierarchy defines narrative relationships between the event groups and permits the at least one critical event and at least one of the optional events within each event group to occur in any chronological order based on the sensor input.

2. The method of claim 1, wherein the controlling comprises at least one of: cueing at least one user action for increasing the narrative pace based on the narrative pace falling below a minimum pace, or inserting a narrative element regardless of user action based on the narrative pace exceeding a maximum pace.

3. The method of claim 1 further comprising packaging the data signal in a computer-readable medium with additional content coordinated with the predefined narrative and configured for providing an alternative output.

4. The method of claim 3, further comprising at least one of providing the additional content including a duplicate of the predefined narrative or providing the additional content that complements without duplicating the predefined narrative.

5. The method of claim 3, wherein the alternative output comprises at least one of a stereoscopic three-dimensional (3D) audio-video output or a two-dimensional (2D) audio-video output.

6. The method of claim 5, further comprising outputting the alternative output contemporaneously with the data signal for the immersive output device.

7. The method of claim 5, further comprising outputting the alternative output at different, non-overlapping times in a sequence with the data signal for the immersive output device.

8. The method of claim 1, wherein the immersive content comprises positional audio data configured to cause positional audio output when provided to the immersive output device.

9. The method of claim 1, further comprising detecting an area of focus of the user and triggering a playback of the one of the plurality of scripted events based on persistence of the area of focus within a predefined region for a defined period.

10. The method of claim 1, wherein the controlling the narrative pace of the scripted events includes one or more of: modifying a quantity or frequency of scene or viewpoint changes, shifting one or more viewpoints gradually, and using a gradual cue for scene changes.

11. An apparatus for outputting at least one of augmented reality (AR) output or a virtual reality (VR) output, comprising:

a processor, a memory coupled to the processor, and a stereoscopic display device coupled to the processor, wherein the memory holds instructions that when executed by the processor, cause the apparatus to perform:

providing, a data signal configured for causing the apparatus to output one of an augmented reality (AR) output or a virtual reality (VR) output when the data signal is processed by the processor, the data signal comprising a plurality of scripted events grouped in one or more event groups, and a narrative ruleset defining a chain of event groups, wherein each event group comprises at least one critical event and a number of optional events, the number of optional events being zero or more;

receiving a sensor input from a sensor configured to detect at least one of eye movement or orientation indicating a user navigation, a viewpoint rotation of the user, a user interaction with the immersive content, a view direction of the user, a focus depth of the user, or a combination thereof; and controlling a narrative pace of the scripted events defined by the narrative ruleset based on the received sensor input, wherein the processor generates continuous video based on when the scripted events occur;

wherein the memory holds further instructions for maintaining a predetermined order of the scripted events according to the narrative ruleset; and wherein the memory holds further instructions for performing the maintaining at least in part by varying an order of the scripted events based on the sensor input, subject to a narrative hierarchy, wherein the narrative hierarchy defines narrative relationships between groups of events and permits events within each group to occur in any chronological order based on the sensor input.

12. The apparatus of claim 11, wherein the memory holds further instructions for cueing at least one user action for increasing the narrative pace based on the narrative pace falling below a minimum pace, or inserting a narrative element regardless of user action based on the narrative pace exceeding a maximum pace.

13. The apparatus of claim 11, wherein the memory holds further instructions for packaging the data signal in a computer-readable medium with additional content coordinated with the predefined narrative and configured for providing an alternative output.

14. The apparatus of claim 13, wherein the memory holds further instructions for at least one of providing the additional content including a duplicate of the predefined narrative, or providing the additional content that complements without duplicating the predefined narrative.

15. The apparatus of claim 13, wherein the memory holds further instructions for providing the additional content for the alternative output comprising at least one of a stereoscopic three-dimensional (3D) audio-video output or a two-dimensional (2D) audio-video output.

16. The apparatus of claim 15, wherein the memory holds further instructions for outputting the alternative output contemporaneously with the data signal for the immersive output device.

17. The apparatus of claim 15, wherein the memory holds further instructions for outputting the alternative output at different, non-overlapping times in a sequence with the data signal for the immersive output device.

18. The apparatus of claim 11, wherein the memory holds further instructions for detecting an area of focus of the user and triggering a playback of the one of the plurality of scripted events based on persistence of the area of focus within a predefined region for a defined period.

19. The apparatus of claim 11, wherein the memory holds further instructions for controlling the narrative pace of the scripted events comprising one or more of: modifying a quantity or frequency of scene or viewpoint changes, shifting one or more viewpoints gradually, and using a gradual cue for scene changes.

20. An apparatus for outputting at least one of augmented reality (AR) output or a virtual reality (VR) output, comprising:

means for providing, a data signal configured for causing the apparatus to output one of an augmented reality (AR) output or a virtual reality (VR) output when the data signal is processed by a processor, the data signal comprising a plurality of scripted events grouped in one or more event groups, and a narrative ruleset defining a chain of event groups, wherein each event group comprises at least one critical event and a number of optional events, the number of optional events being zero or more;

means for receiving a sensor input from a sensor configured to detect at least one of eye movement or orientation indicating a user navigation, a viewpoint rotation of the user, a user interaction with the immersive content, a view direction of the user, a focus depth of the user, or a combination thereof;

means for controlling a narrative pace of the scripted events defined by the narrative ruleset based on the received sensor input, wherein the processor generates continuous video based on when the scripted events occur;

means for maintaining a predetermined order of the scripted events according to the narrative ruleset; and means for performing the maintaining at least in part by varying an order of the scripted events based on the sensor input, subject to a narrative hierarchy, wherein the narrative hierarchy defines narrative relationships between groups of events and permits events within each group to occur in any chronological order based on the sensor input.

* * * * *